(12) United States Patent
Uenohara

(10) Patent No.: US 7,607,524 B2
(45) Date of Patent: Oct. 27, 2009

(54) CLUTCH COVER ASSEMBLY

(75) Inventor: Norihisa Uenohara, Neyagawa (JP)

(73) Assignee: Exedy Corporation, Osaka (JP)

( * ) Notice: Subject to any disclaimer, the term of this patent is extended or adjusted under 35 U.S.C. 154(b) by 408 days.

(21) Appl. No.: 11/604,753

(22) Filed: Nov. 28, 2006

(65) Prior Publication Data

US 2007/0131511 A1 Jun. 14, 2007

(30) Foreign Application Priority Data

Dec. 9, 2005 (JP) ............................. 2005-356826
Dec. 9, 2005 (JP) ............................. 2005-356828

(51) Int. Cl.
*F16D 13/75* (2006.01)
*F16D 13/70* (2006.01)

(52) U.S. Cl. ........................... 192/70.252; 192/109 A; 192/111.16

(58) Field of Classification Search ............ 192/70.252, 192/101, 109 A, 111.13–111.17; 188/71.9, 188/196 F
See application file for complete search history.

(56) References Cited

U.S. PATENT DOCUMENTS

2007/0131510 A1* 6/2007 Uenohara .............. 192/70.252

FOREIGN PATENT DOCUMENTS

JP 03-22131 U 3/1991

* cited by examiner

*Primary Examiner*—Rodney H Bonck
(74) *Attorney, Agent, or Firm*—Global IP Counselors, LLP

(57) ABSTRACT

A clutch cover assembly 1 has a clutch cover 2, a pressure plate 3, a diaphragm spring 4, a first low release load characteristic achieving mechanism 8, and a second low release load characteristic achieving mechanism 30. The second low release load characteristic achieving mechanism 30 includes a support bolt 31, a holder 32, and an adjust spring 39. The adjust spring 39 is located on a side of the holder 32 near the friction member 53 in the axial direction.

20 Claims, 22 Drawing Sheets

CLUTCH COVER ASSEMBLY

CROSS-REFERENCE TO RELATED APPLICATIONS

This application claims priority to Japanese Patent Application Nos. 2005-356826 and 2005-356828 filed on Dec. 9, 2005. The entire disclosure of Japanese Patent Application Nos. 2005-356826 and 2005-356828 are hereby incorporated herein by reference.

BACKGROUND OF THE INVENTION

1. Field of the Invention

The present invention relates to a clutch cover assembly. More specifically, the present invention relates to a clutch cover assembly that presses a friction member of a clutch disc assembly against the flywheel of the engine and releases the friction member from the flywheel.

2. Background Information

A clutch cover assembly is generally attached to a flywheel of an engine to transmit a driving force from the engine to a transmission. The clutch cover assembly is mainly composed of a clutch cover fixed to the flywheel, a pressure plate provided to sandwich a friction member of a clutch disc assembly between itself and the flywheel, and a diaphragm spring provided to press the pressure plate toward the flywheel. The diaphragm spring has an annular elastic portion and a plurality of lever portions extending radially inward from an inner periphery of the annular elastic portion. The diaphragm spring has a pressing function to press the pressure plate and a lever function to release the pressure toward the pressure plate.

Pressing load characteristics of a clutch cover assembly will now be described. The pressing load characteristic shows a use area of the diaphragm spring as a pressing load in load characteristics. For example, as shown in FIG. 6, in the pressing load characteristic 20, an effective use area (a margin of wear) of the clutch cover assembly is an area in which a certain magnitude of the pressing load is obtained (from a set line 25 of a new product to a wear line 26 where the friction member is worn to the wear limit).

Next, the release load characteristic of the clutch cover assembly will be described. The release load characteristic shows a relationship between the operation amount (the stroke of lever) of a release lever and the load that is applied to the tips of the release lever (release load). For example, as shown in FIG. 9, the release load characteristic 60 has a first portion 61 that linearly increases from the lever stroke zero, a second portion 62 that gradually decreases, and makes a peak at the load balance point 63 when the first portion 61 and the second portion 62 contact. The first portion 61 indicates lever rigidity of the diaphragm spring, and the second portion 62 corresponds to changes from the set line toward the right side in figures in the pressing load characteristic.

Pressing load characteristic 20 increases, as shown in FIG. 6, at a constant rate as displacement magnitude of the diaphragm spring increases from zero, but it gradually decreases after the deflection amount crosses a certain point (peak point), and gradually increases after the deflection amount crosses another point. Accordingly, a peak 21 (a portion convex upward) in the effective use area is formed, and as the wear of friction member increases (the set line shifts leftward in figures), the pressing load increases. In other words, when the friction member is worn, the release load increases and it is difficult to avoid the increase of the clutch pedal pressure.

Therefore, as a structure to cut the peak in the pressing load characteristics, peak cut clutches have been known that use elastic member to generate a load to counteract the load of the diaphragm spring when the friction member is worn. In the peak cut clutch, the opposite peak in the characteristic of the elastic member is superimposed onto the peak in a characteristic of the diaphragm spring so that a flat portion is obtained in the composite load.

In view of the above, it will be apparent to those skilled in the art from this disclosure that there exists a need for an improved clutch cover assembly. This invention addresses this need in the art as well as other needs, which will become apparent to those skilled in the art from this disclosure.

SUMMARY OF THE INVENTION

It is an object of the present invention to shorten the axial dimension of a clutch cover assembly that includes a peak cut mechanism and a low release load mechanism.

It is another object of the present invention to reduce the number of components in a clutch cover assembly that includes a peak cut mechanism and a low release load mechanism.

It is a further other object of the present invention to downsize a peak cut mechanism and a low release load mechanism.

According to a first aspect of the present invention, a clutch cover assembly that presses a friction member of a clutch disc assembly with a cushioning function against a flywheel of an engine and releases the pressing is provided. The clutch cover assembly includes a clutch cover, a pressure plate, a diaphragm spring, a first elastic member, a second elastic member, and a wear compensation mechanism. The clutch cover is configured to be fixed to the flywheel. The pressure plate is non-rotatably fixed to the clutch cover to sandwich the friction member between the flywheel and itself. The diaphragm spring is supported by the clutch cover to urge the pressure plate toward the flywheel. The first elastic member is supported by the clutch cover to generate a load counteracting an urging force of the diaphragm spring such that change in the pressing load to the pressure plate in response to displacement magnitude of the diaphragm spring is flattened. The second elastic member is supported by the clutch cover to generate a load counteracting an urging force of the diaphragm spring during a release operation such that pressing load to the pressure plate is progressively decreased as displacement magnitude of the diaphragm spring is increased by the cushioning effect of the friction member. The wear compensation mechanism maintains a posture of the second elastic member in response to wear of the friction member. The wear compensation mechanism includes a support member, a support and engagement member, and a third elastic member. The support member extends from the pressure plate toward the clutch cover. The support and engagement member is threadedly engaged with the outer circumference of the support member and bears a load from the second elastic member in a direction axially away from the friction member. The third elastic member always applies torque to the support and engagement member so that the support and engagement member will rotate to move in a direction axially away from the friction member. The third elastic member is located on a side of the support and engagement member near the friction member in the axial direction.

In this clutch cover assembly, since the third elastic member is located on a side of the support and engagement member near the friction member in the axial direction, the third elastic member does not protrude from the clutch cover. Consequently, it is possible to reduce the amount the wear compensation mechanism protrudes from the clutch cover, thereby dramatically reducing the axial dimension of the clutch cover assembly.

A clutch cover assembly according to a second aspect of the present invention is the clutch cover assembly of the first aspect, wherein the third elastic member is located between the clutch cover and the pressure plate in the axial direction.

In this clutch cover assembly, since the third elastic member is located between the clutch cover and the pressure plate in the axial direction, the third elastic member does not protrude from the clutch cover. Consequently, it is possible to reduce the amount the wear compensation mechanism protrudes from the clutch cover, thereby further reducing the axial dimension of the clutch cover assembly.

According to a third aspect of the present invention, a clutch cover assembly that presses a friction member of a clutch disc assembly with a cushioning function against a flywheel of an engine and releases the pressing is provided. The clutch cover assembly includes a clutch cover, a pressure plate, a diaphragm spring, a first elastic member, a second elastic member, and a wear compensation mechanism. The clutch cover is configured to be fixed to the flywheel. The pressure plate is non-rotatably fixed to the clutch cover to sandwich the friction member between the flywheel and itself. The diaphragm spring is supported by the clutch cover to urge the pressure plate toward the flywheel. The first elastic member is supported by the clutch cover to generate a load counteracting an urging force of the diaphragm spring such that change in the pressing load to the pressure plate in response to displacement magnitude of the diaphragm spring is flattened. The second elastic member is supported by the clutch cover to generate a load counteracting an urging force of the diaphragm spring during a release operation such that pressing load to the pressure plate is progressively decreased as displacement magnitude of the diaphragm spring is increased by the cushioning effect of the friction member. The wear compensation mechanism maintains the posture of the second elastic member in response to wear of the friction member. The wear compensation mechanism includes a support member, a support and engagement member, and a third elastic member. The support member extends from the pressure plate toward the clutch cover. The support and engagement member is threadedly engaged with the outer circumference of the support member and is given a load from the second elastic member in an axial direction away from the friction member. The third elastic member always applies torque to the support and engagement member so that the support and engagement member will rotate to move in an axial direction away from the friction member. The third elastic member is located between the clutch cover and the pressure plate in the axial direction.

In this clutch cover assembly, since the third elastic member is located between the clutch cover and the pressure plate in the axial direction, the third elastic member does not protrude from the clutch cover. Consequently, it is possible to reduce the amount the wear compensation mechanism protrudes from the clutch cover, thereby dramatically reducing the axial dimension of the clutch cover assembly.

A clutch cover assembly according to a fourth aspect of the present invention is the clutch cover assembly of the first aspect, wherein the support and engagement member covers an end of the support member.

In this clutch cover assembly, since the support and engagement member covers the end of the support member, the screw portion of the support member can be covered with the support and engagement member. In other words, the support and engagement member serves as a dust cover. As a result, a dust cover would not be necessary, thereby further reducing the number of components and the axial dimension.

According to a fifth aspect of the present invention, a clutch cover assembly that presses a friction member of a clutch disc assembly with a cushioning function against a flywheel of an engine and releases the pressing is provided. The clutch cover assembly includes a clutch cover, a pressure plate, a diaphragm spring, a first elastic member, a second elastic member, and a wear compensation mechanism. The clutch cover is configured to be fixed to the flywheel. The pressure plate is non-rotatably fixed to the clutch cover to sandwich the friction member between the flywheel and itself. The diaphragm spring is supported by the clutch cover to urge the pressure plate toward the flywheel. The first elastic member is supported by the clutch cover to generate a load counteracting an urging force of the diaphragm spring such that change in the pressing load to the pressure plate in response to displacement magnitude of the diaphragm spring is flattened. The second elastic member is supported by the clutch cover to generate a load counteracting an urging force of the diaphragm spring during a release operation such that the pressing load to the pressure plate progressively decreases as the displacement magnitude of the diaphragm spring is increased by the cushioning effect of the friction member. The wear compensation mechanism maintains the posture of the second elastic member in response to wear of the friction member. The wear compensation mechanism includes a support member, a support and engagement member, and a third elastic member. The support member extends from the pressure plate toward the clutch cover. The support and engagement member is threadedly engaged with the outer circumference of the support member and is given a load from the second elastic member in an axial direction away from the friction member. The third elastic member always applies torque to the support and engagement member so that the support and engagement member will rotate to move in an axial opposite direction away from the friction member.

In this clutch cover assembly, since the support and engagement member covers the end of the support member, it is possible to cover the screw portion of the support member with the support and engagement member. In other words, the support and engagement member serves as a dust cover. Consequently, since the dust cover that has been required becomes unnecessary, it is possible to reduce the number of components and further reduce the axial dimension.

A clutch cover assembly according to a sixth aspect of the present invention is the clutch cover assembly of the first aspect, wherein the support and engagement member includes a support and engagement member main body having a cylindrical shape that is threadedly engaged with the outer circumference of the support member, an annular engagement portion that is formed at one end of the support and engagement member main body and receives torque from the third elastic member, and a head that covers the other end of the support and engagement member main body.

In this clutch cover assembly, since the support and engagement member has a head, the screw portion of the support member is reliably covered.

A clutch cover assembly according to a seventh aspect of the present invention is the clutch cover assembly of the sixth aspect, wherein the axial cross section of the head has a polygonal shape.

In this clutch cover assembly, since the axial cross section of a head has a polygonal shape, it is easy to fit a tool into the head. As a result, it is easy to screw the support and engagement member into the support member with a tool, thereby making it easy to assemble the wear compensation mechanism.

A clutch cover assembly according to an eighth aspect of the present invention is the clutch cover assembly of the first aspect, wherein the wear compensation mechanism further includes a guide plate located between the support and engagement member and the third elastic member in the axial direction. One end of the third elastic member is engaged with the guide plate.

In this clutch cover assembly, since one end of the third elastic member is engaged with the guide plate, it is possible to position one end of the third elastic member with the guide plate. Consequently, it becomes easy to assemble the support and engagement member with the third elastic member, thereby making it easy to assemble the wear compensation mechanism.

A clutch cover assembly according to a ninth aspect of the present invention is the clutch cover assembly of the eighth aspect, wherein the support and engagement member is formed member with a first hole with which one end of the third elastic member is engaged. The guide plate is formed with a second hole with which one end of the third elastic member is engaged. A radial position of the first hole is substantially the same as that of the second hole.

In this clutch cover assembly, since a radial position of the first hole of the engagement portion is substantially the same as that of the second hole, by inserting one end of the third elastic member into the first hole, it is easy to position one end of the third elastic member and the second hole relative to each other. Consequently, it is easy to assemble the support and engagement member with the third elastic member, thereby making it easy to assemble the wear compensation mechanism.

According to a tenth aspect of the present invention, a clutch cover assembly that presses a friction member of a clutch disc assembly with a cushioning function against a flywheel of an engine and releases the pressing is provided. The clutch cover assembly includes a clutch cover, a pressure plate, a diaphragm spring, a first elastic member, and a second elastic member. The clutch cover is configured to be fixed to the flywheel. The pressure plate is non-rotatably fixed to the clutch cover to sandwich the friction member between the flywheel and itself. The diaphragm spring is supported by the clutch cover to urge the pressure plate toward the flywheel. The first elastic member is supported by the clutch cover to generate a load counteracting an urging force of the diaphragm spring such that change in the pressing load to the pressure plate in response to displacement magnitude of the diaphragm spring is flattened. The second elastic member is supported by the clutch cover to generate a load counteracting an urging force of the diaphragm spring during a release operation such that pressing load to the pressure plate is includes a support member, a support and displacement magnitude of the diaphragm spring is increased by the cushioning effect of the friction member. The first and second elastic members are arranged in the axial direction.

In this clutch cover assembly, since the first and second elastic members are arranged in the axial direction, it is unnecessary to locate the peak cut mechanism and the low release load mechanism at different positions in the circumferential direction and the radial direction. Consequently, it is possible to reduce the installation spaces of the peak cut mechanism and the low release load mechanism, thereby downsizing a clutch cover assembly including a peak cut mechanism and a low release load mechanism.

A clutch cover assembly according to an eleventh aspect of the present invention is the clutch cover assembly of the tenth aspect, wherein the first and second elastic members are located coaxially.

In this clutch cover assembly, since the first and second elastic members are located coaxially, it is possible to reduce installation spaces of the peak cut mechanism and the low release load mechanism, thereby more reliably downsizing a clutch cover assembly including a peak cut mechanism and a low release load mechanism. In addition, the peak cut mechanism and the low release load mechanism can share components. Consequently, in the clutch cover assembly, it is possible to reduce the number of components and the cost of manufacturing.

A clutch cover assembly according to a twelfth aspect of the present invention is the clutch cover assembly of the tenth aspect, wherein the second elastic member is located between the first elastic member and the pressure plate in the axial direction.

According to a thirteenth aspect of the present invention, a clutch cover assembly that presses a friction member of a clutch disc assembly with a cushioning function against a flywheel of an engine and releases the pressing is provided. The clutch cover assembly includes a clutch cover, a pressure plate, a diaphragm spring, a first elastic member, and a second elastic member. The clutch cover is configured to be fixed to the flywheel. The pressure plate is non-rotatably fixed to the clutch cover to sandwich the friction member between the flywheel and itself. The diaphragm spring is supported by the clutch cover to urge the pressure plate toward the flywheel. The first elastic member is supported by the clutch cover to generate a load counteracting an urging force of the diaphragm spring such that change in the pressing load to the pressure plate in response to the displacement magnitude of the diaphragm spring is flattened. The second elastic member is supported by the clutch cover to generate a load counteracting an urging force of the diaphragm spring during a release operation such that pressing load to the pressure plate is progressively decreased as the displacement magnitude of the diaphragm spring is increased by the cushioning effect of the friction member. The second elastic member is located between the first elastic member and the pressure plate in the axial direction.

In this clutch cover assembly, since the second elastic member is located between the first elastic member and the pressure plate in the axial direction, it is unnecessary to arrange the peak cut mechanism and the low release load mechanism in the circumferential direction and the radial direction. Consequently, it is possible to reduce the installation spaces of the peak cut mechanism and the low release load mechanism, thereby downsizing a clutch cover assembly including a peak cut mechanism and a low release load mechanism.

A clutch cover assembly according to a fourteenth aspect of the present invention is the clutch cover assembly of the tenth aspect, wherein first elastic members are arranged in the circumferential direction so as to start to produce the loads at least different timings in response to change in displacement magnitude of the diaphragm spring.

In this clutch cover assembly, by using the first elastic members that are set to start to generate the loads at different timings, it is possible to realize preferable pressing load characteristics.

A clutch cover assembly according to a fifteenth aspect of the present invention is the clutch cover assembly of the tenth aspect, wherein the assembly further includes a support member being fixed to the pressure plate to receive the load from the first and second elastic members.

In this clutch cover assembly, since the support member is provided to receive the load from the first and second elastic members, the peak cut mechanism and the low release load mechanism can share components. Consequently, it is possible to reduce the number of components and the cost of manufacturing.

According to a sixteenth aspect of the present invention, a clutch cover that assembly presses a friction member of a clutch disc assembly with a cushioning function against a flywheel of an engine and releases the pressing is provided. The clutch cover assembly includes a clutch cover, a pressure plate, a diaphragm spring, a first elastic member, a second elastic member, and a support member. The clutch cover is configured to be fixed to the flywheel. The pressure plate is non-rotatably fixed to the clutch cover to sandwich the friction member between the flywheel and itself. The diaphragm spring is supported by the clutch cover to urge the pressure plate toward the flywheel. The first elastic member is supported by the clutch cover to generate a load counteracting an urging force of the diaphragm spring such that change in the pressing load to the pressure plate in response to displacement magnitude of the diaphragm spring is flattened. The second elastic member is supported by the clutch cover to generate a load counteracting an urging force of the diaphragm spring during a release operation such that pressing load to the pressure plate is progressively decreased as displacement magnitude of the diaphragm spring is increased by the cushioning effect of the friction member. The support member is a member fixed to the pressure plate to receive the load from the first and second elastic members.

In this clutch cover assembly, since the support member that receives the load from the first and second elastic members is provided, the peak cut mechanism and the low release load mechanism can share components. Consequently, it is possible to reduce the number of components and the cost of manufacturing.

A clutch cover assembly according to a seventeenth aspect of the present invention is the clutch cover assembly of the fifteenth aspect, wherein the assembly further includes a wear compensation mechanism to maintain a posture of the second elastic member in response to wear of the friction member. The wear compensation mechanism includes the support member that extends from the pressure plate toward the clutch cover, a second support and engagement member that is threadedly engaged with the outer circumference of the support member and is given a load from the second elastic member in an axially opposite direction of the friction member, and a third elastic member to apply constantly torque to the support and engagement member so that the support and engagement member will rotate to move in an axial direction away from the friction member.

A clutch cover assembly according to an eighteenth aspect of the present invention is the clutch cover assembly of the seventeenth aspect, wherein a first support and engagement member is fixed to the support member. The first support and engagement member receives a load from the first elastic member in the axial direction away from the friction member. The second support and engagement member is located between the first support and engagement member and the pressure plate in the axial direction.

In this clutch cover assembly, the simple structure of the first support and engagement member makes it possible for the peak cut mechanism and the low release load mechanism to share components.

A clutch cover assembly according to a nineteenth aspect of the present invention is the clutch cover assembly of the tenth aspect, the assembly further includes a plurality of fixing members to fix the first elastic member to the clutch cover. The first and second elastic members are cone springs. Outer circumferential portions of the first and second elastic members are sandwiched between the fixing members and the clutch cover in the axial direction.

In this clutch cover assembly, since the first and second elastic members can be fixed with the fixing member, the peak cut mechanism and the low release load mechanism can share components. Consequently, it is possible to reduce the number of components and the cost of manufacturing.

A clutch cover assembly according to a twentieth aspect of the present invention is the clutch cover assembly of the nineteenth aspect, wherein an intermediate member is sandwiched between outer circumferential portions of the first and second elastic members in the axial direction.

In the clutch cover assembly, the intermediate member makes it possible to ensure a space between the first and second elastic members in the axial direction. Consequently, even if the wear compensation mechanism is operated to move the axial position of the second elastic member toward the first elastic member, it is possible to prevent the contact between the first elastic member and the second elastic member. In addition, even if the outer diameter of the second elastic member is smaller than that of the first elastic member, it is possible to support reliably the second elastic member via the first elastic member and intermediate member.

In the clutch cover assembly according to the present invention, the axial dimension can be shortened by changing locations of the third elastic member or shapes of the support and engagement member. Furthermore, in the clutch cover assembly according to the present invention, by changing locations of the third elastic member or shapes of the support and engagement member, the number of components can be reduced. Moreover, in the clutch cover assembly according to the present invention, by arranging the first and second elastic members in the axial direction, the peak cut mechanism and the low release load mechanism can be downsized and the mechanisms can be installed into an even smaller clutch cover assembly. Furthermore, in the clutch cover assembly according to the present invention, by providing the support member that receives the load from the first and second elastic members, it is possible to reduce the number of components and the cost of manufacturing for the peak cut mechanism and the low release load mechanism.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The inventors have proposed clutch cover assemblies having a low release load mechanism in order to further lower the release load in the peak cut clutches.

A description will be made on release load lowering by the cushioning function in the friction member. In a case having no cushioning function, as shown in a release load characteristic of FIG. 9, the release load characteristic 60 is linearly changed to a load balance point 63, then gradually decreases, and gradually increases. Clutch release travel of the pressure plate is zero under the load balance point 63. If the friction member has a cushion function, a repulsive force of the cushion starts to move the pressure plate upon the start of the release operation, and the pressure plate has moved to some extent at the load balance point 63. This means that at the load balance point the pressing load is shifted rightward in FIG. 6. As a result, in FIG. 9, the release load at the load balance point 63 becomes smaller to a large extent than that in a case having no cushioning function. The reason is that in the pressing load characteristic of FIG. 6 the pressure plate travels though the negative gradient area during the release operation. Therefore, it can be considered that pressure plate travels through the flat area or the positive gradient area if the position of the set line is changed by the wear of the friction member. In that case, it is impossible to obtain a release load decrease by the cushioning function of the friction member.

Figure 21:
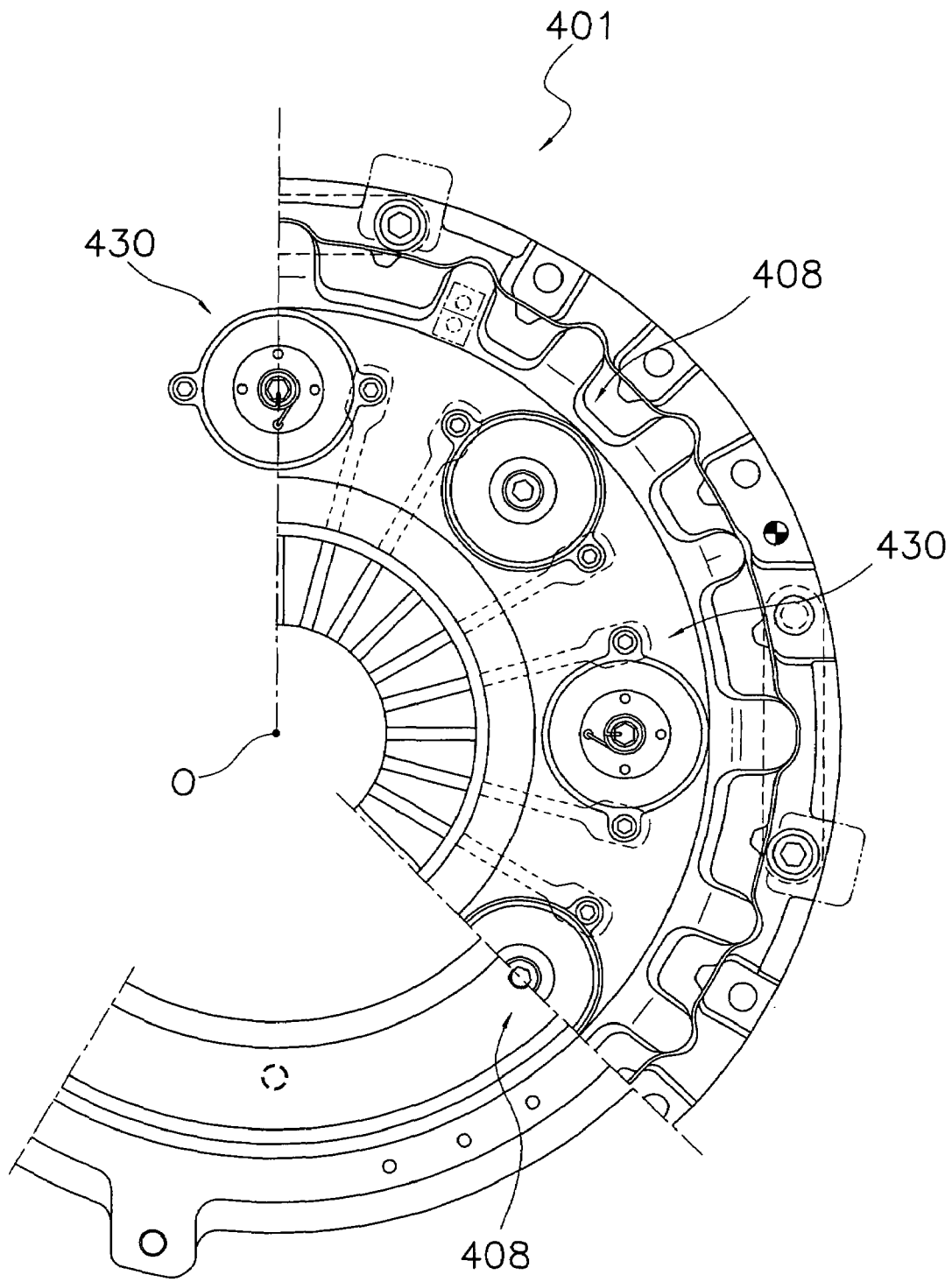
FIG. 21 is an elevational schematic view of a clutch cover assembly used for comparison to the present invention.
Figure 22:
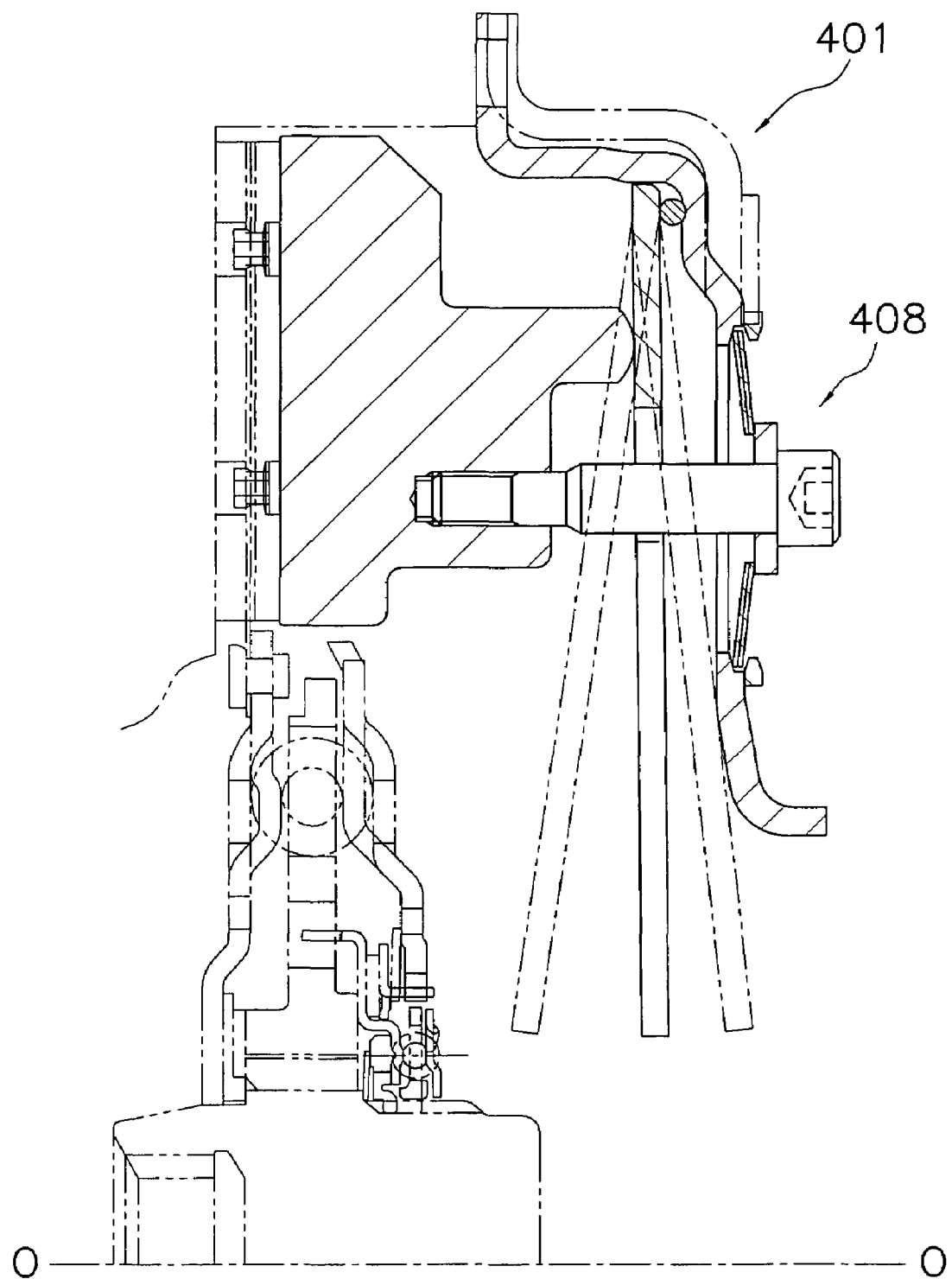
FIG. 22 is a longitudinal cross-sectional schematic view of a portion of the clutch cover assembly near a first low release load characteristic achieving mechanism (peak cut mechanism) used for comparison to the present invention.
Figure 23:
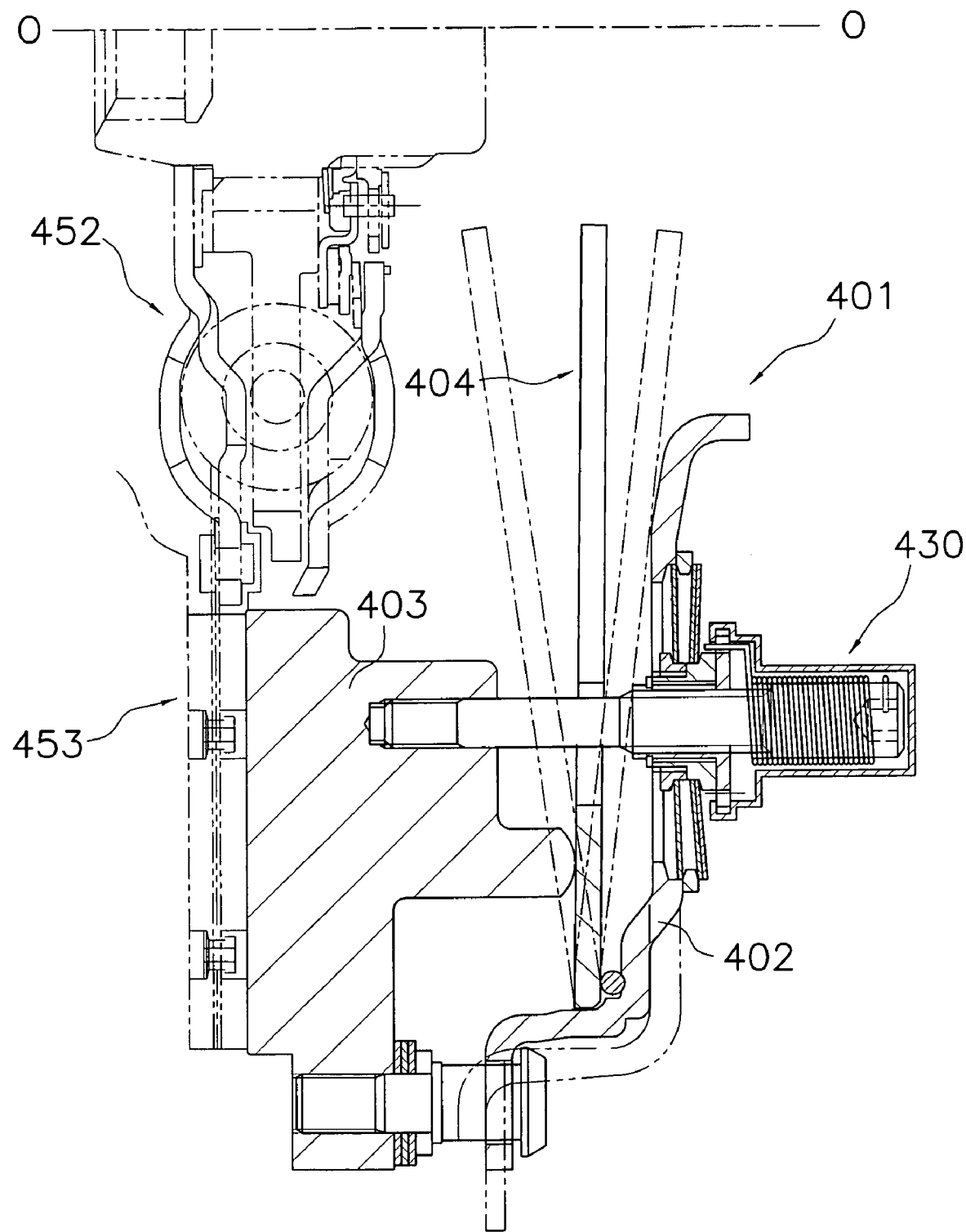
FIG. 23 is a longitudinal cross-sectional schematic view of a portion of the clutch cover assembly near the second low release load characteristic achieving mechanism (low release load mechanism) used for comparison to the present invention.
Figure 24:
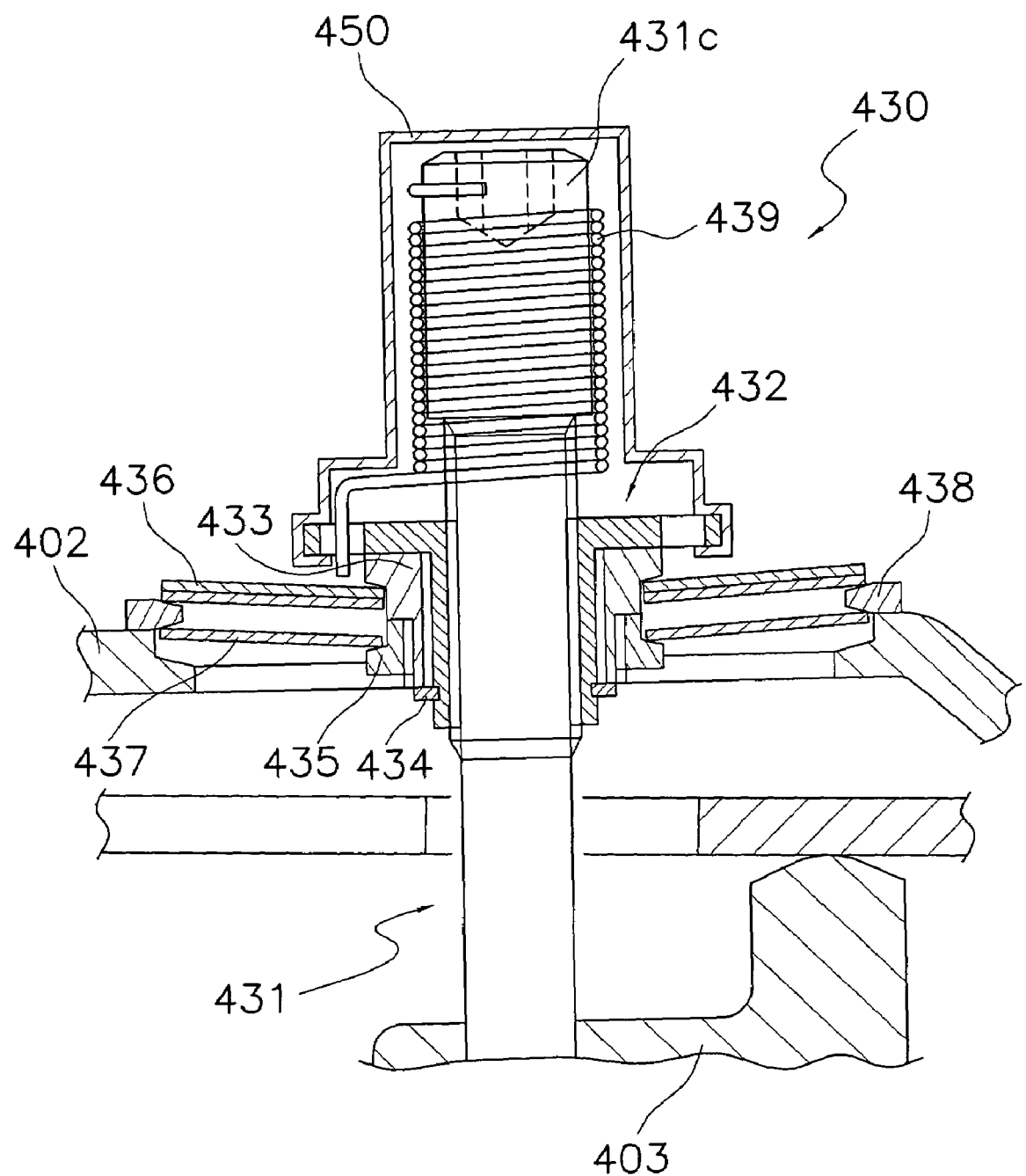
FIG. 24 is a longitudinal cross-sectional schematic view of a second low release load characteristic achieving mechanism of the clutch cover used for comparison to the present invention.

Therefore, the inventors have proposed clutch cover assemblies that can realize release load lowering even if the friction member is worn. FIG. 21 is an elevational schematic view of a clutch cover assembly the inventors have proposed. FIG. 22 is a longitudinal cross-sectional schematic view of a portion of a clutch cover assembly near a first low release load characteristic achieving mechanism (peak cut mechanism). FIG. 23 is a longitudinal cross-sectional schematic view of a portion of a clutch cover assembly around a second low release load characteristic achieving mechanism (low release load mechanism). FIG. 24 is a longitudinal cross-sectional schematic view of the second low release load characteristic achieving mechanism. Referring to FIGS. 22 and 23, a clutch cover assembly 401 has a pressure plate 403, a diaphragm spring 403, and a damper mechanism 452, and realizes the peak cut function by a first low release load characteristic achieving mechanism 408, and lowers the release load by a second low release load characteristic achieving mechanism 430. However, the clutch cover assembly 401 has the following disadvantages.

As shown in FIG. 24, the second low release load characteristic achieving mechanism 430 is made of a support bolt 431, a holder 432, a first support member 433, a snap ring 434, a second support member 435, a pair of first cone springs 436, a second cone spring 437, a support ring 438, and an adjust spring 439. Further, as shown in FIGS. 23 and 24, the adjust spring 439 is wound around a head 431c of the support bolt 431, and is located on a side of the holder 432 opposite of a friction member 453 in the axial direction (on a right side of the holder 432 in FIG. 12). Accordingly, the adjust spring 439 and the head 431c of the support bolt 431 protrude to a great extent from a clutch cover 402 in the axially opposite direction of the friction member 453, thereby increasing the axial dimension of the clutch cover assembly.

Furthermore, as shown in FIGS. 23 and 24, in the second low release load characteristic achieving mechanism 430, the adjust spring 439, the screw portions of the support bolt 431, and the second support member 435 are exposed from the clutch cover 402. Therefore, considering that dust can move into the screw portions and rust the components, it is necessary to attach a dust cover 450. Consequently, the number of components is great, and the axial dimension of clutch cover assembly is further increased.

Furthermore, as shown in FIG. 21, in the clutch cover assembly 401, the first and second low release load characteristic achieving mechanisms 408 and 430 are respectively located at four positions. Since the first and second low release load characteristic achieving mechanisms 408 and 430 use cone springs, they need installation spaces in the circumferential direction. Consequently, although it is possible to install the mechanisms into the large clutch cover assembly shown in FIG. 21, it is difficult to install them into a small clutch cover assembly.

(1) Overall Structure of a Clutch Cover Assembly

Figure 1:
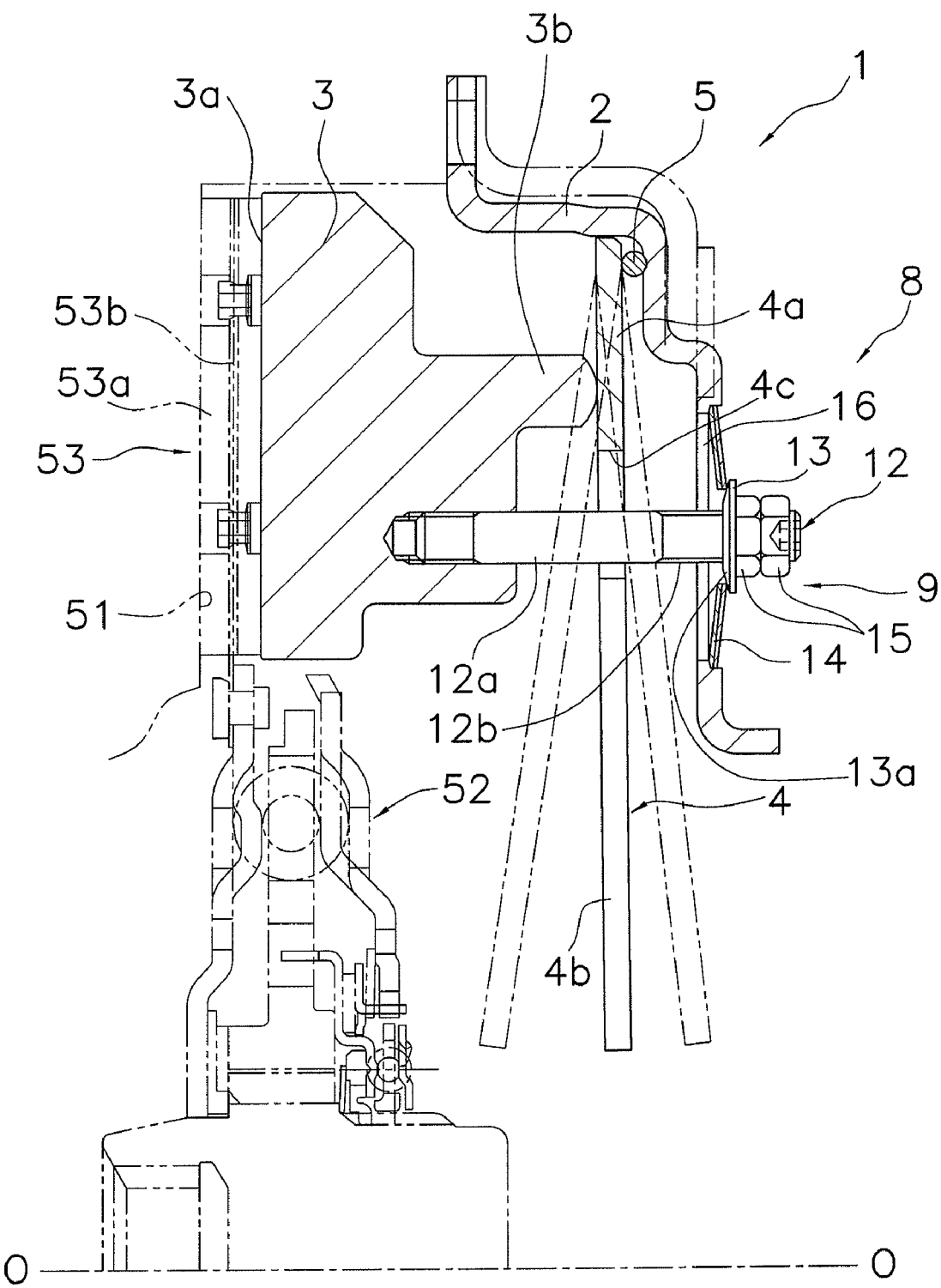
FIG. 1 is a longitudinal cross-sectional view of a clutch cover assembly according to a first preferred embodiment of the present invention.
Figure 2:
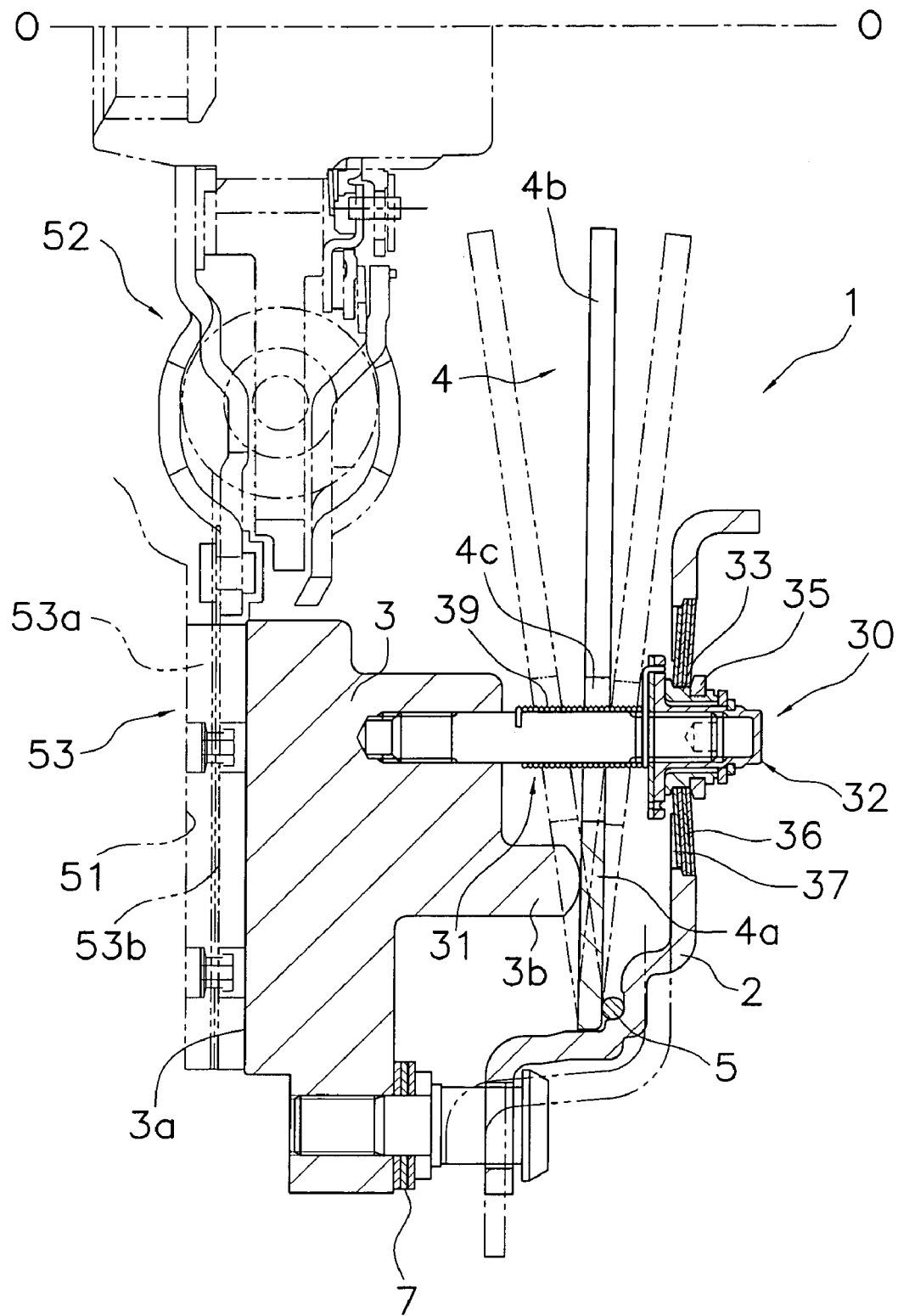
FIG. 2 is an alternate longitudinal cross-sectional schematic view of the clutch cover assembly according to the first embodiment of the present invention.
Figure 3:
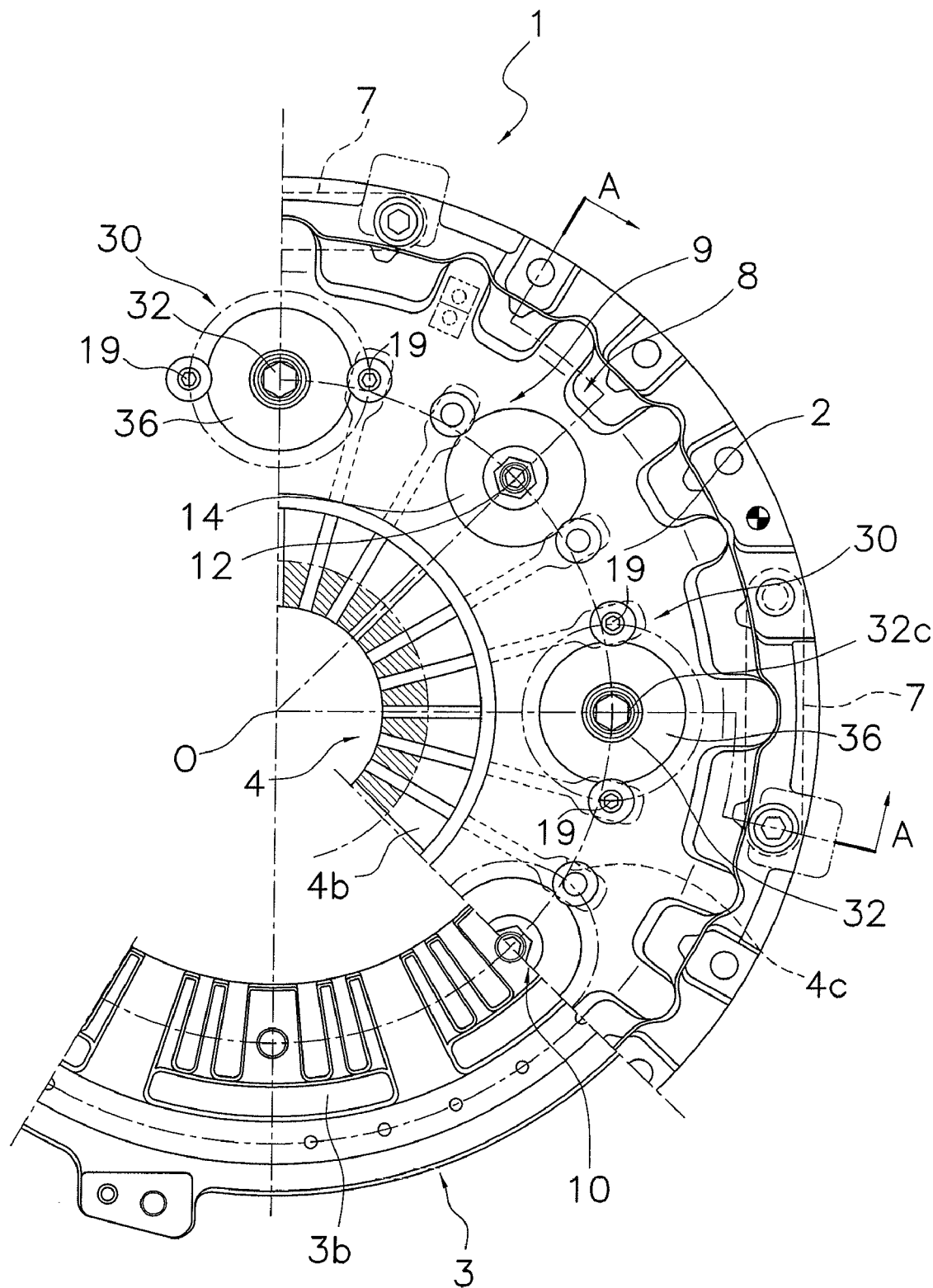
FIG. 3 is an elevational view of the clutch cover assembly according to the first embodiment of the present invention with sections removed for illustrative purposes.

A pull-type diaphragm spring clutch cover assembly 1 shown in FIG. 1 to FIG. 3 is provided to engage a clutch by pressing a friction member 53 of a clutch disc assembly 52 against a flywheel 51 of an engine, or to disengage a clutch by releasing the pressing load. The friction member 53 has friction facings 53a and cushioning plates 53b so that it has a cushioning function of deflecting within a certain range in an axial direction.

A line O-O shown in FIG. 1 and FIG. 2 is a rotational axis of the flywheel 51 and the clutch cover assembly 1. The left side in figures will be referred to as "axial engine-side," and the right side in figures will be referred to as "axial transmission-side."

The clutch cover assembly 1 mainly has a clutch cover 2, a pressure plate 3, and a diaphragm spring 4. The clutch cover 2 is an approximately dish-shaped plate member, and has a radially outer end fixed to the flywheel 51 by bolts, for example. The clutch cover 2 has a disc portion counteracting a radially outer portion of the flywheel 51 with a gap therebetween in the axial direction.

The pressure plate 3 is an annular member formed with an annular and pressing surface 3a facing the flywheel 51. The friction member 53 of the clutch disc assembly 52 is provided between the pressing surface 3a and the flywheel 51. The pressure plate 3 is formed with a plurality of protrusions 3b projecting in the axial direction on a surface opposite the pressing surface 3a. As seen in FIGS. 2 and 3, the pressure plate 3 is connected to the clutch cover 2 by a plurality of strap plates 7 so that it can move relative to the clutch cover 2 in the axial direction but not in the rotational direction.

The diaphragm spring 4 is a disc-like member that is located between the pressure plate 3 and the clutch cover 2, and has an annular elastic portion 4a and a plurality of lever portions 4b extending radially inward from an inner periphery of the annular elastic portion 4a. The annular elastic portion 4a has a radially inner portion that is in contact with the protrusions 3b of the pressure plate 3. The annular elastic portion 4a has a radially outer portion that is supported by the clutch cover 2 via a wire ring 5. In this state, the annular elastic portion 4a urges the pressure plate 3 toward the flywheel 51. Slits are formed between the lever portions 4b of the diaphragm spring 4, each of the slits having an oval hole 4c at their radially outer ends. A pull-type release device (not shown), including a release bearing and so on, is engaged with tips of the lever portions 4b of the diaphragm spring 4.

(2) First Low Release Load Characteristic Achieving Mechanism

Next, referring to FIGS. 1 and 3, a description will be made on a first low release load characteristic achieving mechanism 8. The first low release load characteristic achieving mechanism 8 is a mechanism that can realize a low release load characteristic by flattening the pressing load characteristics even if the friction member 53 is progressively worn. As shown in FIG. 3, the mechanism 8 is made of first units 9 and second units 10 that are arranged in the circumferential direction. The number of each of the first units 9 and the second units 10 is preferably two, and they are located alternately in the circumferential direction. Accordingly, the mechanism 8 can generate the loads in a balanced manner in the circumferential direction.

The first unit 9 is made of, as shown in FIG. 1, a support bolt 12, a spring seat 13, two cone springs 14 (first elastic member), and two support nuts 15. The support bolt 12 extends from a radially inner portion of a surface of the pressure plate 3 on which the protrusions 3b are formed toward the transmission in the axial direction. The support bolt 12 has a base 12a and a screw portion 12b. The base 12a of the support bolt 12 penetrates the oval hole 4c of the diaphragm spring 4 and extends further in the axial direction. The screw portion 12b of the support bolt 12 is a portion having a surface on which a spiral screw is formed, and is located on the axial transmission-side of the base 12a. The clutch cover 2 is formed with holes 16 corresponding to the support bolts 12. The hole 16 is circular and larger than the oval hole 4c. The screw portion 12b extends through the hole in the axial direction and has one end on which the support nuts 15 are screwed. The spring seat 13 is an annular member and is in contact with an axial engine-side surface of one of the support nuts 15. The cone springs 14 is made of two springs stacked such that they operate in parallel with each other, and are located on a side of the hole 16 of the clutch cover 2 toward the transmission in the axial direction. The combination of the springs makes it possible to set a preferable load in each of the first units 9. The outer periphery of the cone spring 14 is supported by the edge of the hole 16 of the clutch cover 2. The spring seat 13 is formed with a tapered face 13a on the axial engine-side. The inner circumferential periphery of the cone spring 14 is supported by the tapered face 13a of the spring seat 13.

When the clutch is not worn during the clutch engagement operation, the cone springs 14 do not generate a load. In contrast, when the friction member 53 of the clutch disc assembly 52 is worn, the pressure plate 3 and the support bolt 12 move toward the engine in the axial direction. Accordingly, the cone springs 14 are compressed between the clutch cover 2 and the spring seat 13 to provide a load to both members 2 and 13. The load which the cone springs 14 give to the support bolt 12 and others counteracts the pressing load which the diaphragm spring 4 gives to the pressure plate 3 so that the pressing load of the diaphragm spring 4 can be reduced, thereby reducing the release load as well (later described).

Figure 5:
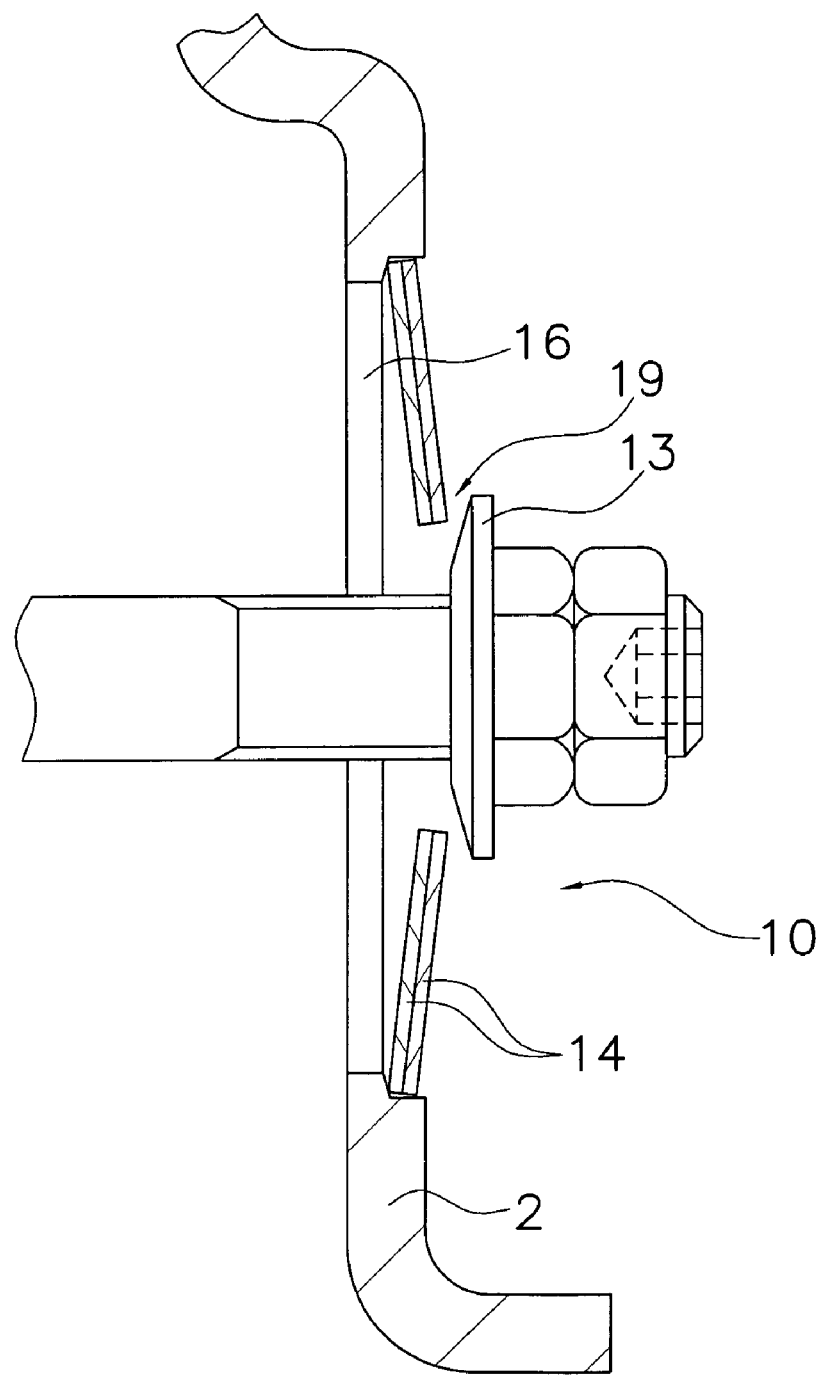
FIG. 5 is a longitudinal cross-sectional schematic view of the first low release load characteristic achieving mechanism in a second unit of the clutch cover assembly.

Referring to FIG. 5, the second unit 10 has a basic structure that is the same as or similar to that of the first unit 9. However, as shown in FIG. 5, a gap 19 is defined in the axial direction between the inner circumferential periphery of the cone spring 14 and the spring seat 13. In other words, at the initial stage of wear of the friction member 53, the cone springs 14 of the second unit 10 do not generate a load. In other words, the timing for the start of compression of the cone springs 14 of the second unit 10 is shifted from that of the cone springs 14 of the first unit 9 by the time corresponding to the gap 19.

Figure 6:
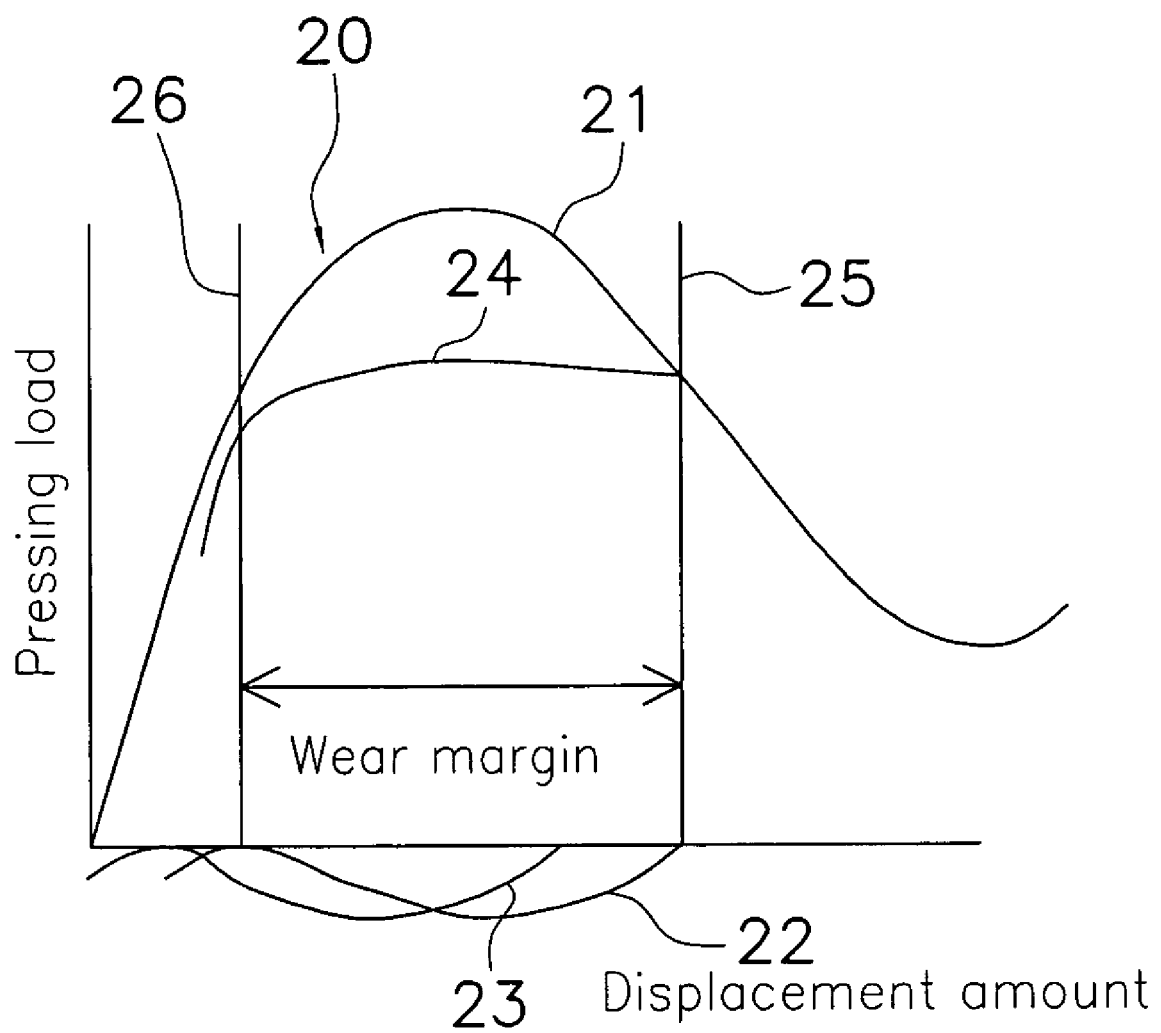
FIG. 6 is a view of a graph provided to explain pressing load characteristics of the clutch cover assembly.

A description will be made on the pressing load characteristics of FIG. 6. The characteristic 20 of the diaphragm spring 4 has the peak 21, as described above. In contrast, the characteristic 22 of the cone springs 14 of the first unit 9 and the characteristic 23 of the cone springs 14 of the second unit 10 have opposite peaks to cancel the peak 21 (a portion convex downward) to form a composite load flat portion 24. More specifically, the cone springs 14 of the first unit 9 generate the load from the set line 25, and has a bottom positioned at the end of a margin of wear. The cone springs 14 of the second unit 10 generate the load from a point shifted from the set line 25 to some extent, and has a bottom shifted from the end of a margin of wear to some extent. Accordingly, since two kinds of cone springs are combined for use, it is possible to realize the composite load flat portion 24, which ensures the sufficiently large margin of wear. As a result, the clutch pedal pressure changes little when the friction member 53 is worn compared to a situation in which it is not worn, thereby improving the maneuvering feeling at the release operation.

(3) Second Low Release Load Characteristic Achieving Mechanism

Referring to FIG. 2 and FIG. 3, a description will be made on a mechanism 30 to achieve low release load characteristic. The low release load characteristic achieving mechanism 30 is a release assist mechanism to realize a release load lowering by a cushioning function in the friction member 53 even if the friction member 53 is worn.

Figure 9:
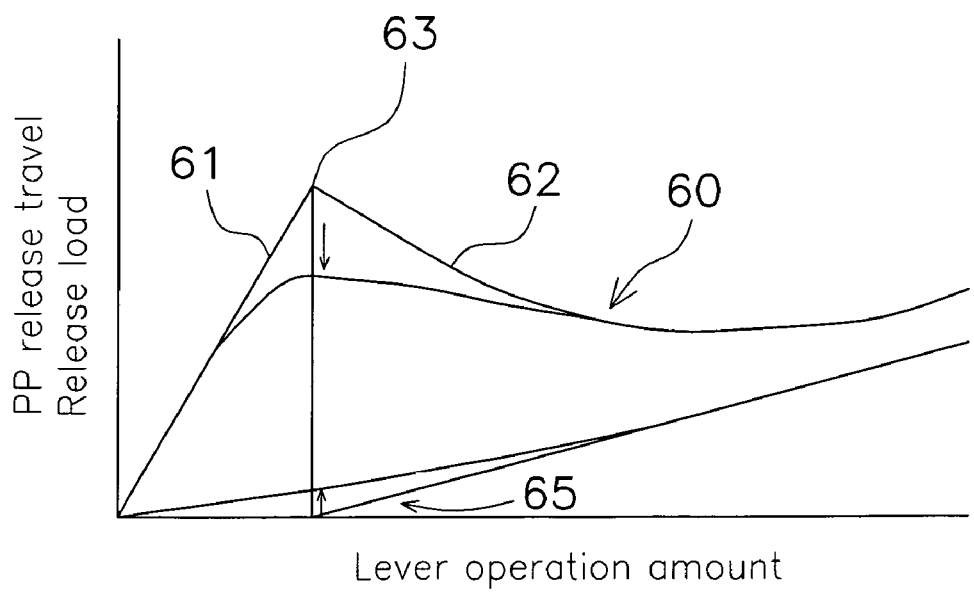
FIG. 9 is a view explaining the release load characteristics of clutch cover assembly.

First, referring to FIG. 9, a description will be made on the release load lowering by the cushioning function of the friction member. In a case with no cushioning function, the release load characteristic 60 linearly increases to a peak, i.e., the load balance point 63, gradually decreases from the peak, and then gradually increases. It should be noted that the clutch release travel 65 of the pressure plate is zero up to the load balance point 63. If the friction member has a cushion function, the movement of the pressure plate becomes faster at the release operation. More specifically, the clutch release travel 65 of the pressure plate increases faster when compared to a case with no cushioning plate. In FIG. 9, the peak at the load balance point 63 is decreased to a large extent, realizing low release load characteristics. The reason why the above-mentioned result is obtained is that a position of the pressure plate moves during the release operation in a negative gradient direction (right direction) in the pressing load characteristics in FIG. 6. Accordingly, if the position of the set line is changed because of the wear of the friction member, the pressure plate may move during the release operation travel through the flat portion or the positive gradient portion. Therefore, the second low release load characteristic achieving mechanism 30 makes it possible for the pressure plate to move in a negative gradient direction in the load characteristic even if the friction member is worn.

The second low release load characteristic achieving mechanisms 30 are, as shown in FIG. 3, alternately located at the same radial position as the first units 9 and the second units 10 of the low release load characteristic achieving mechanisms 8. The second low release load characteristic achieving mechanisms 30 are preferably positioned at a total of four positions in this embodiment. The low release load characteristic achieving mechanism 30 includes, as shown in FIG. 4, a support bolt 31 (support member), a holder 32 (support and engagement member), a first support member 33, a snap ring 38a, an intermediate member 38b, a second support member 35, three first cone springs 36 (second elastic member), a second cone spring 37 (second elastic member), and an adjust spring 39 (third elastic member).

The support bolt 31 extends from a surface of the pressure plate 3 on which the protrusions 3b are formed toward the transmission in the axial direction. The support bolt 31 has a base 31a and a screw portion 31b. The base 31a penetrates the oval hole 4c of the diaphragm spring 4 in the axial direction. The adjust spring 39 (third elastic member) is wound around the perimeter of the base 31a, as later described. The screw portion 31b is a portion whose surface is formed with a spiral screw, and is located within a hole 11 in the clutch cover 2. The hole 11 has an approximately circular shape.

Figure 4:
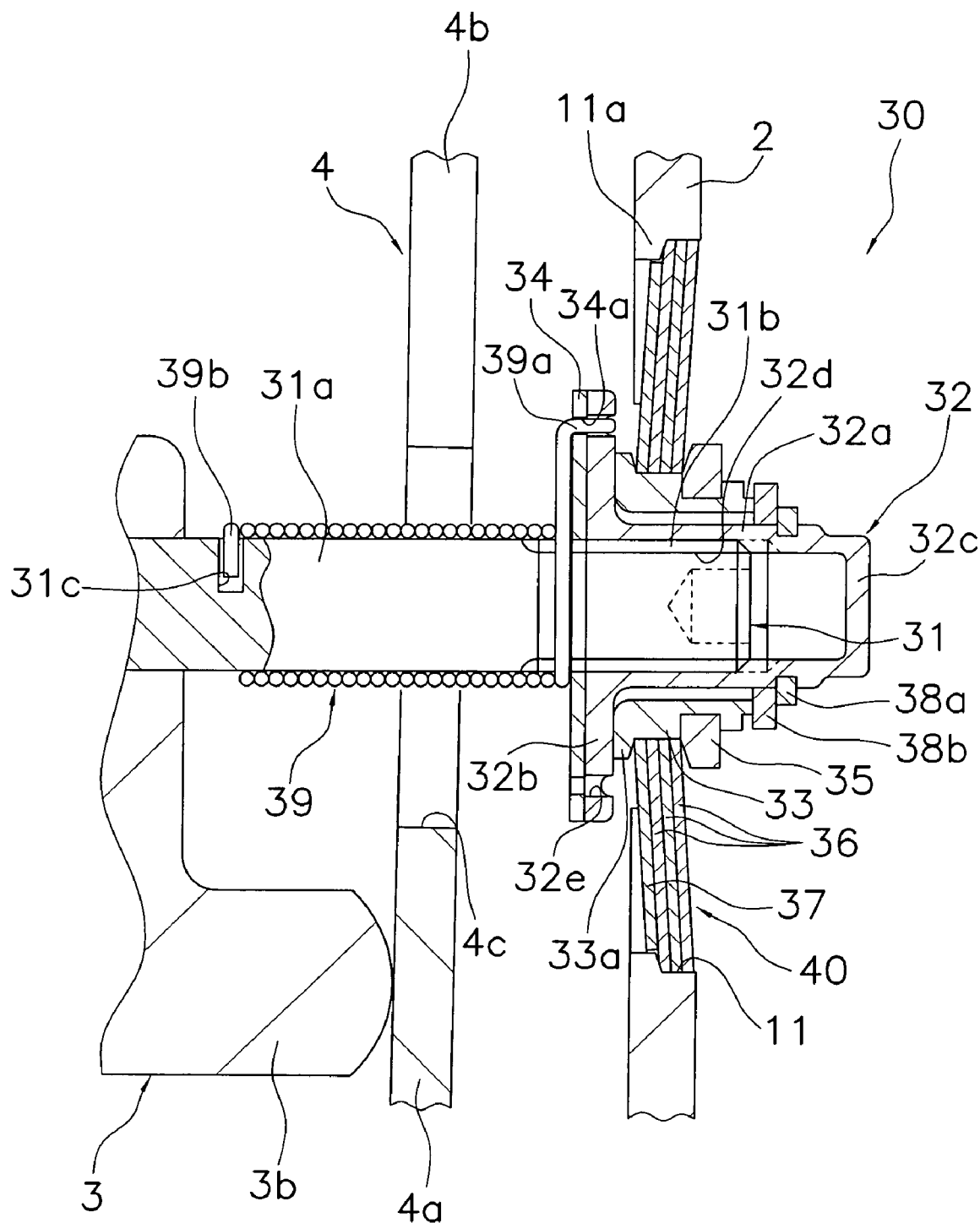
FIG. 4 is a partial enlarged view of FIG. 2 illustrating a second low release load characteristic achieving mechanism of the clutch cover assembly.

Referring to FIGS. 2 and 4, the holder 32 is a member that receives a load opposite the friction member 53 in the axial direction from the first cone springs 36 and the second cone spring 37, and includes a holder main body 32a (support and engagement member main body), a flange portion 32b (engagement portion), and a head 32c. The holder main body 32a is a portion extending cylindrically in the axial direction, and has an inner circumference formed with a screw 32d to be threadedly engaged with the screw portion 31b. The holder main body 32a is threadedly engaged with the screw portion 31b of the support bolt 31. In a state of FIG. 4, a part of the screw portion 31b corresponds to a portion on a side of the holder main body 32a toward the transmission in the axial direction.

The flange portion 32b is an annular portion extending radially outward from an axially engine-side end of the holder main body 32a, and is integrally molded with the holder main body 32a. The flange portion 32b is formed with a plurality of holes 32e that penetrate in the axial direction. A first engagement end 39a of the adjust spring 39 penetrates the hole 32e, and the flange portion 32b receives torque from the adjust spring 39.

Referring now to FIGS. 3 and 4, the head 32c is a portion formed to cover an axially transmission-side end of the holder main body 32a, and preferably has a hexagonal shape in an axial cross section. The shape of the head 32c may be a polygon other than a hexagon. As shown in FIG. 4, the holder 32 covers the end of the support bolt 31 when it is threadedly engaged with the screw portion 31b.

The first support member 33 is a tubular member disposed around the holder 32. The holder 32 has an axially engine-side end having an outer surface around which the snap ring 38a is fitted. The intermediate member 38b is sandwiched between the end of the first support member 33 and the snap ring 38a. In other words, the first support member 33 is held so that it cannot move in the axial direction with a gap between itself and the holder 32. It should be noted that a gap is defined in the radial direction between the inner circumference of the first support member 33 and the outer circumference of the holder 32 so that both members can rotate relative to each other. The second support member 35 is an annular member that is fixed to an outer surface of the axially transmission-side end of the first support member 33. As described above, the holder 32, the first support member 33, and the second support member 35 constitute one assembly that can move in the axial direction as one member.

The three first cone springs 36 are stacked to operate in parallel with each other. The first cone spring 36 has an inner periphery in contact with the second support member 35 from the axially engine-side, and an outer periphery in contact with the annular protrusion 11a formed in the hole 11 of the clutch cover 2 from the axial transmission-side. The second cone spring 37 has an inner periphery in contact with the annular protrusion 33a of the first support member 33 from the axial transmission-side, and an outer periphery in contact with the first cone spring 36 from the axial engine-side. As a result, no spacer is provided between the first cone springs 36 and the second cone spring 37 in the axial direction.

Consequently, the first cone springs 36 can apply a load to the assembly including the holder 32 and so on toward the transmission in the axial direction, and the second cone spring 37 can apply a load to the assembly including the holder 32 and so on toward the engine in the axial direction. The first and second cone springs 36 and 37 barely apply a load to the holder 32 in a clutch engagement state, but they apply a load to the holder 32 toward the transmission in the axial direction during a clutch release operation to lower the release load. In other words, the load of the first cone springs 36 is larger than that of the second cone spring 37.

The adjust spring 39 is a torsion coil spring, and is located between the clutch cover 2 and the pressure plate 3 in the axial direction, more specifically, on the axial engine-side of the holder 32 (near the friction member 53). A guide plate 34 is located as a circular plate member between the adjust spring 39 and the holder 32 in the axial direction. The adjust spring 39 is wound around the base 31a of the support bolt 31, and the first engagement end 39a (one end) of the adjust spring 39 penetrates a hole 32e (second hole) of the guide plate 34 and is inserted into the hole 32e of the holder 32. A second engagement end 39b of the adjust spring 39 is fitted into a hole 31c of the support bolt 31 so that the adjust spring 39 is attached to the support bolt 31. In other words, when the adjust spring 39 is wound up, and the adjust spring 39 applies a substantially constant load to the holder 32 in one rotational direction. In this case, the load applying direction of the adjust spring 39 is a direction in which the holder 32 moves toward the transmission in the axial direction along the screw portion 31b.

As clearly understood from the above-described structures, since the adjust spring 39 is located between the clutch cover 2 and the pressure plate 3 in the axial direction, and on the axial engine-side of the holder 32, the adjust spring 39 does not project outward of the clutch cover 2 (more specifically, on the axial transmission-side of the clutch cover 2). As a result, it is possible to reduce the projection of the second low release load characteristic achieving mechanism 30 including the wear compensation mechanism from the clutch cover 2 so that the axial dimension of the clutch cover assembly 1 can be shortened dramatically.

Also, in this clutch cover assembly 1, since the holder 32 covers the end of the support bolt 31, the screw portion of the support bolt 31 can be covered by the holder 32. In other words, the holder 32 serves as a dust cover. As a result, a dust cover, which is necessary in the clutch cover of FIG. 21, is no longer required so that the number of components is reduced and the axial dimension of the clutch cover assembly is shortened further. Additionally, since the holder 32 has the head 32c, it is possible to cover reliably the screw portion of the support bolt 31.

Figure 7:
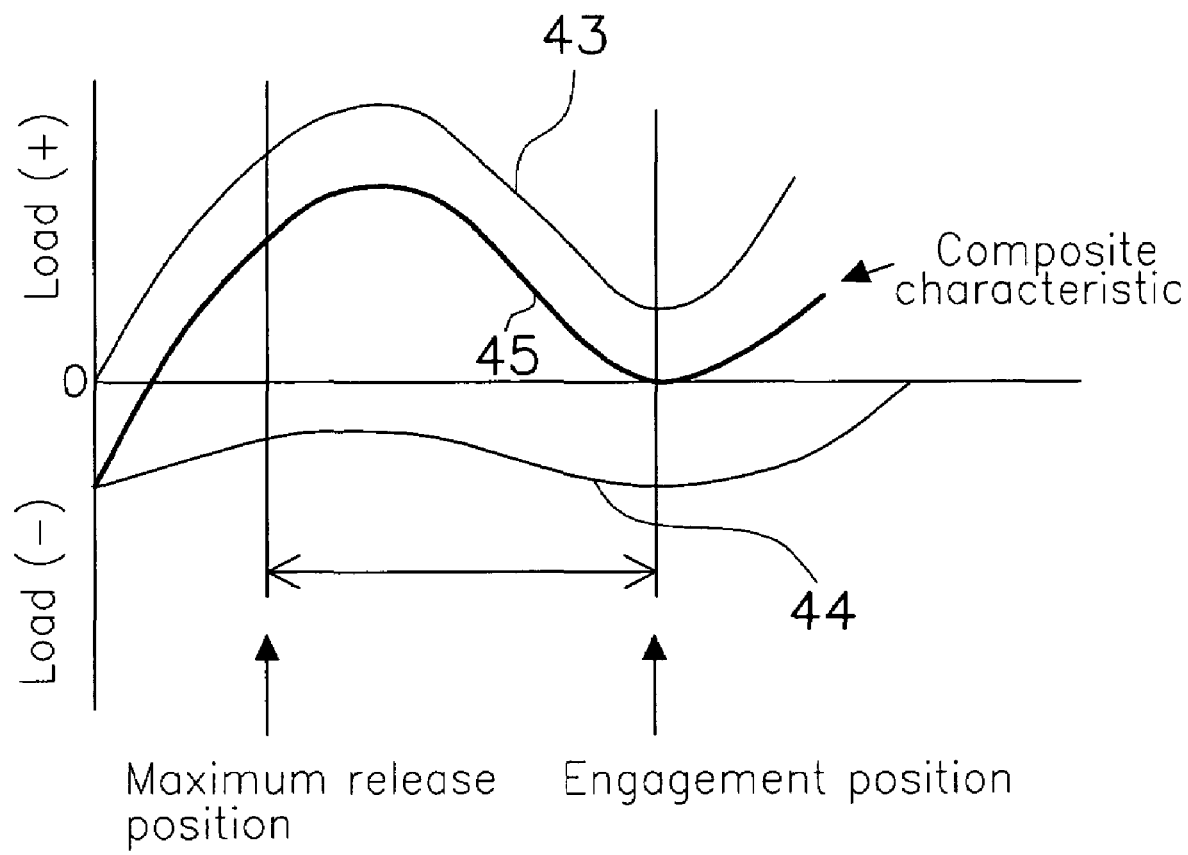
FIG. 7 is a view of a graph illustrating composite characteristics of the second low release load characteristic achieving mechanism.
Figure 8:
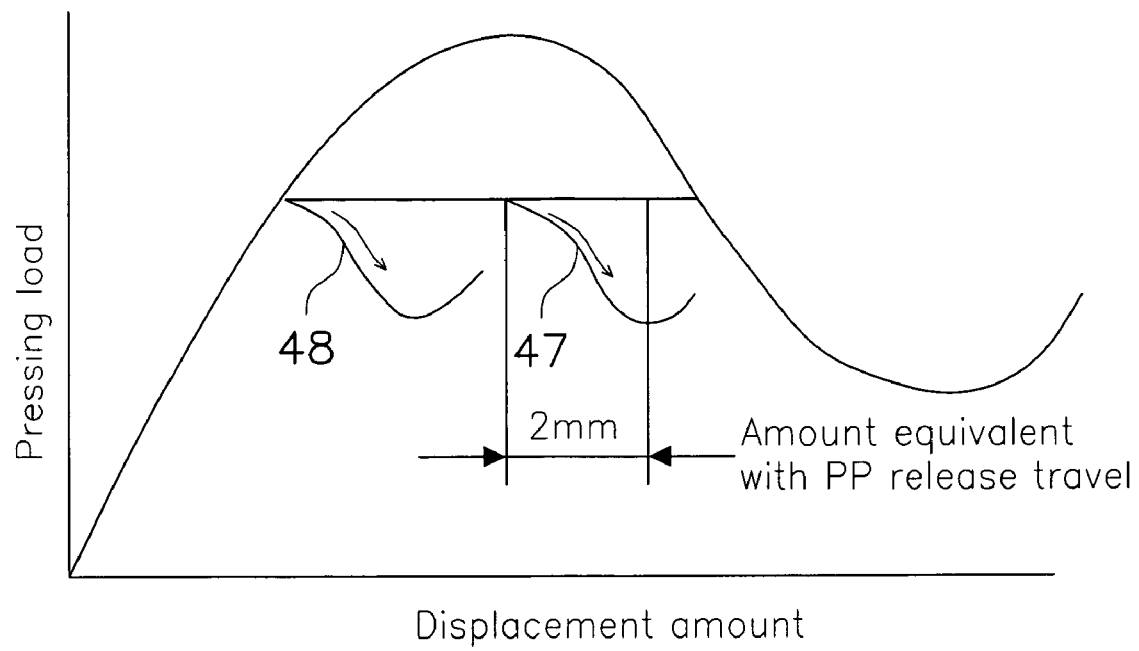
FIG. 8 is a view of a graph explaining a negative gradient characteristic that is obtained when the cushioning function is fulfilled in the set load characteristic in the clutch cover assembly.

The operation of the second low release load characteristic achieving mechanism 30 will be described. As shown in FIG. 7, the characteristic 43 of the first cone springs 36 generates a load toward the positive side (toward the transmission in the axial direction), and the characteristic 44 of the second cone spring 37 generates a load toward the negative side (toward the engine in the axial direction). In the characteristic 43 of the first cone springs 36, the difference between the bottom and the peak is large, and the gradient is large. In the characteristic 44 of the second cone spring 37, the difference between the bottom and the peak is small, and the gradient is small. In the composite characteristic 45, the bottom is positioned in the clutch engagement position, having zero load. Preferably, the bottom load of the composite characteristics 45 is designed to be zero or lower. As the characteristic shifts from the zero load point toward the maximum release position, the load increases gradually toward the positive side. This phenomenon is seen in the set load characteristic in FIG. 8: when the release operation is performed after the friction member 53 is worn, the cushion function of the friction member 53 shifts the set line toward the maximum displacement magnitude like the lines 47 and 48. In other words, a negative gradient is always ensured in the pressing characteristic so that the release load lowering can be reliably realized by the cushion function.

In a clutch engagement state, a force (torque) to rotate the holder 32 by the adjust spring 39 and the friction force at the screw faces by the composite load (axial load) of the cone springs 36 and 37 are balanced. Consequently, in this state, the axial load to the support bolt 31 has a value a little bit larger than zero. When the friction member 53 is worn, the support bolt 31 and the holder 32 move toward the engine in the axial direction. Then, the cone springs 36 and 37 are deformed further, and the loads of these components are lowered to be zero. At this time, the second spring 39 rotates the holder 32 to move it toward the engine in the axial direction. Then, the axial composite load by the cone springs 36 and 37 increases and the friction force at the screw face shows a proportional increase. As a result, it becomes impossible to rotate the holder 32 by the torque of the adjust spring 39, and the holder 32 stops the axial movement. As mentioned before, even if the friction member 53 is worn, the postures of the cone springs 36 and 37 in the low release load characteristic achieving mechanism 30 return to the initial states. Therefore, the postures of the cone springs 36 and 37 are maintained even if the friction member 53 is worn to maintain a constant load of the low release load characteristic achieving mechanism 30.

(4) Assembling of the Second Low Release Load Characteristic Achieving Mechanism 30

The assembling of the second low release load characteristic achieving mechanism 30 will be described referring to FIG. 4.

First, a cone spring assembly 40, which is made of the first cone springs 36, the second cone spring 37, the first support member 33 and the second support member 35, is pre-assembled. More specifically, one second cone spring 37 and three first cone springs 36 are assembled on the outer circumference of the first support member 33. Next, the second support member 35 is fitted into the first support member 33, and the first cone springs 36 and the second cone spring 37 are sandwiched between the first support member 33 and the second support member 35 in the axial direction. Then, the second support member 35 is fixed to the first support member 33 by welding, for example, while the first cone springs 36 and the second cone spring 37 are compressed. As a result, the cone spring assembly 40 is assembled from the first cone springs 36, the second cone spring 37, the first support member 33, and the second support member 35.

Meanwhile, the support bolt 31 is screwed into the pressure plate 3. The adjust spring 39 is inserted into the base 31a of the support bolt 31, and then the second engagement end 39b of the adjust spring 39 is inserted into the hole 31c of the base 31a. Then, the first engagement end 39a of the adjust spring 39 is inserted into the hole 34a (second hole) of the guide plate 34.

Next, the holder 32 is screwed onto the screw portion 31b while the adjust spring 39 and the guide plate 34 are assembled onto the support bolt 31. Since the adjust spring 39 is located on the axial engine-side of the holder 32, it is easier to perform the screwing operation of the holder 32 in comparison to clutch cover of FIG. 21. In addition, since the shape in the axial cross section of the head 32c of the holder 32 is hexagonal as described before, it is easy to screw the holder 32 with a wrench or the like, thereby making it easy to assemble the second low release load characteristic achieving mechanism 30.

When the holder 32 is screwed into the screw portion 31b, the holder 32 moves toward the pressure plate 3 and before long the first engagement end 39a and the flange portion 32b of the holder 32 come into contact with each other in the axial direction. At this time, since the first engagement end 39a of the adjust spring 39 is inserted into the hole 34a of the guide plate 34, the first engagement end 39a is positioned in the radial direction. In addition, since the radial position of the hole 32e of the flange portion 32b is substantially the same as that of the hole 34a of the guide plate 34, the radial position of the first engagement end 39a of the adjust spring 39 substantially corresponds to that of the hole 32e of the flange portion 32b. Accordingly, compared to a case not having the guide plate 34, it is easier to hook the first engagement end 39a of the adjust spring 39 into the hole 32e of the holder 32, thereby making it easy to assemble the holder 32 with the adjust spring 39. It is considered that it may be difficult to achieve the winding operation of the adjust spring 39 and the installing operation of the adjust spring 39 to the holder 32 since the adjust spring 39 should be located on the axial engine-side of the holder 32. The guide plate 34, however, solves these problems as described above.

The holder 32 is further screwed, while the first engagement end 39a of the adjust spring 39 is hooked into the hole 32e of the holder 32. In a state that the holder 32 is screwed into the support bolt 31 up to a certain position in the axial direction, the cone spring assembly 40 and the intermediate member 38b are fitted around the first support member 33. Then, the snap ring 38a is fitted around the holder 32 so that the cone spring assembly 40 is assembled into the holder 32.

As described above, in this clutch cover assembly 1, by designing locations of the adjust spring 39 and the holder 32 and providing the guide plate 34, the performance of assembling the second low release load characteristic achieving mechanism 30 is improved dramatically.

(5) Clutch Engagement Operation and Release Operation

Referring to FIG. 1, in this clutch cover assembly 1, in a state in which the release device (not shown) does not apply the load to the tips of the lever portions 4b of the diaphragm spring 4, the annular elastic portion 4a applies the pressing load to the pressure plate 3. As a result, the friction member 53 of the clutch disc assembly 52 is pressed against the flywheel 51 so that torque is transmitted to the clutch disc assembly 52 (in a clutch engagement state).

When a release device (not shown) pulls out the tips of the lever portions 4b of the diaphragm spring 4 toward the transmission, the radially inner portion of the annular elastic portion 4a of the diaphragm spring 4 is pulled up toward the transmission in the axial direction at the wire ring 5 as a fulcrum. By this operation, the annular elastic portion 4a no longer presses the pressure plate 3, the pressure plate 3 is separated from the friction member 53 by the strap plates 7, and finally the friction member 53 is disengaged from the flywheel 51 (in a clutch disengagement state).

(6) Effects of the Present Invention

Effects of the present invention will be described as follows.

As seen in FIG. 2, since the adjust spring 39 is located on a side of the holder 32 near the friction member 53 in the axial direction in the clutch cover assembly 1, the adjust spring 39 does not protrude out of the clutch cover 2. As a result, it is possible to reduce the amount the second low release load characteristic achieving mechanism 30 protrudes from the clutch cover, thereby dramatically shortening the axial dimension of the clutch cover assembly 1.

Furthermore, as seen in FIG. 4, in this clutch cover assembly 1, since the holder 32 covers the end of the support bolt 31, it is possible to cover the screw portion 31b of the support bolt 31 with the holder 32. In other words, the holder 32 serves as a dust cover. As a result, since the dust cover that has been required becomes unnecessary, it is possible to reduce the number of components and further reduce the axial dimension.

Furthermore, in the clutch cover assembly 1, one end of the adjust spring 39 is engaged with the guide plate 34, it is possible to position one end of the adjust spring 39 with the guide plate 34. As a result, it is easy to assemble the holder 32 with the adjust spring 39, i.e., the second low release load characteristic achieving mechanism 30 can be assembled easily.

ALTERNATE EMBODIMENTS

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiment that are identical to the parts of the first embodiment may be omitted for the sake of brevity.

Second Embodiment

Figure 10:
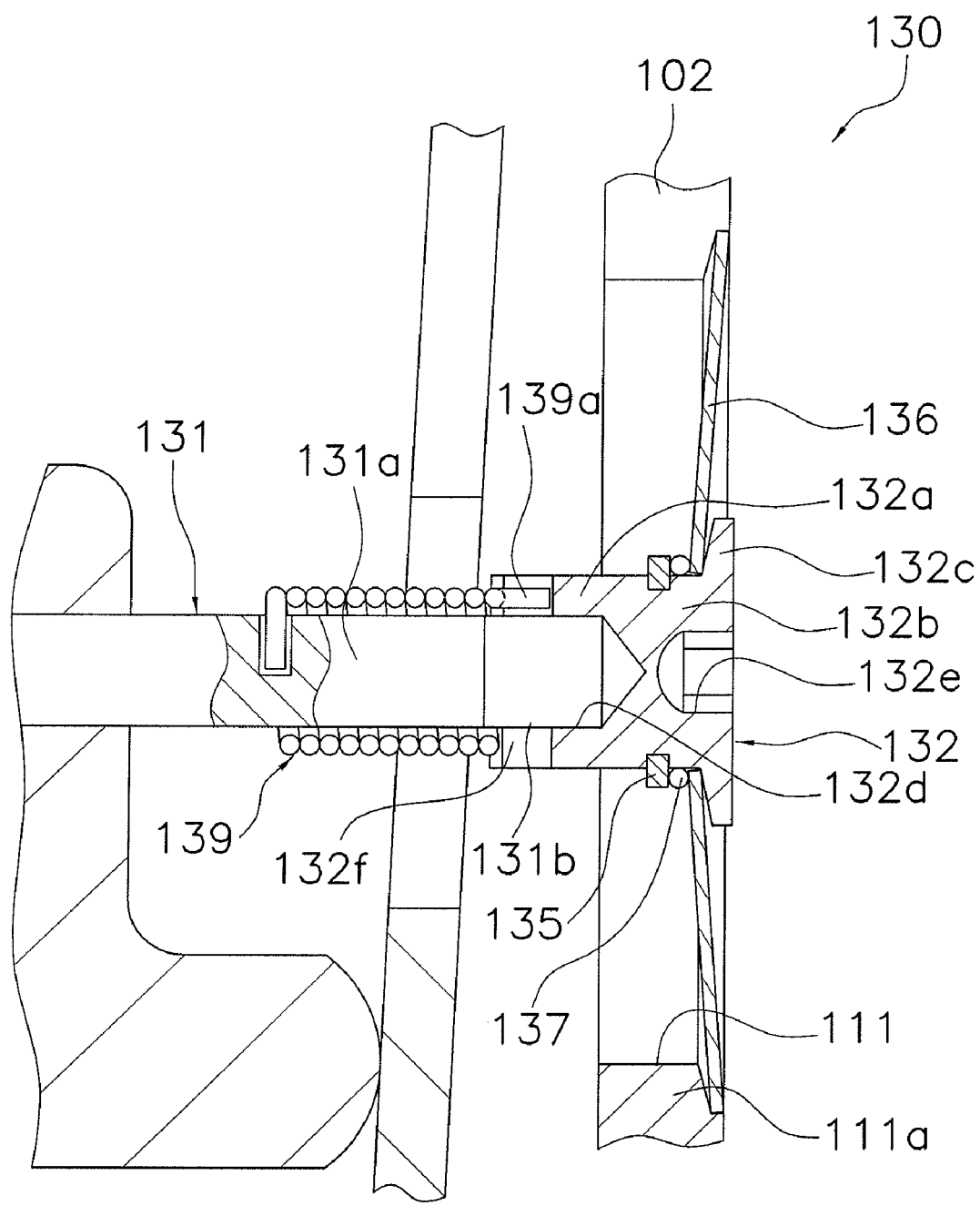
FIG. 10 is a view of a longitudinal cross-sectional schematic view of a second low release load characteristic achieving mechanism according to a second preferred embodiment of the present invention.

With reference to FIG. 10, a description will be made on a second low release load characteristic achieving mechanism 130 according to a second preferred embodiment of the present invention. The second low release load characteristic achieving mechanism 130 is a mechanism that realizes similar functions of the mechanism 30 in the above-described embodiment, and is installed into a clutch cover 102. FIG. 10 represents a clutch engagement state.

The low release load characteristic achieving mechanism 130 in this embodiment is made of a support bolt 131 (support member), a holder 132 (support and engagement member), a snap ring 135, an intermediate ring 137, a cone spring 136 (second elastic member), and an adjust spring 139 (third elastic member).

The support bolt 131 includes, like the above-mentioned embodiment, a base 131a and a screw portion 131b. The structure of each component is the same as or similar to those of the above-mentioned embodiment, so a detailed explanation will be omitted.

The holder 132 is composed of a holder main body 132a (support and engagement member main body), an engagement portion 132f, a head 132b, and an annular protrusion 132c. The holder main body 132a is a cylindrical portion extending in the axial direction, and has an inner circumference formed with a screw 132d to be threadedly engaged with the screw portion 131b. The holder main body 132a is threadedly engaged with the screw portion 131b of the support bolt 131. The engagement portion 132f is a portion extending in the axial direction from the axially engine-side end of the holder main body 132a, and is engaged with an engagement end 139a of the second adjust spring 139. The head 132b is a portion that covers the axial transmission-side end of the holder main body 132a and penetrates a hole 111 of a clutch cover 102 in the axial direction. The annular protrusion 132c is an annular portion formed around the head 132b. The head 132b is formed with a hex socket 132e in the center on an axial transmission-side face thereof.

The cone spring 136 is located around the head 132b. The cone spring 136 has an inner periphery in contact with the annular protrusion 132c from the axial engine-side, and an outer periphery in contact with an annular protrusion 111a formed around the hole 111 in the clutch cover 102 from the axial transmission-side. The snap ring 135 is fitted around the head 132b, and the intermediate ring 137 is sandwiched between the inner periphery of the cone spring 136 and the snap ring 135 in the axial direction.

Figure 11:
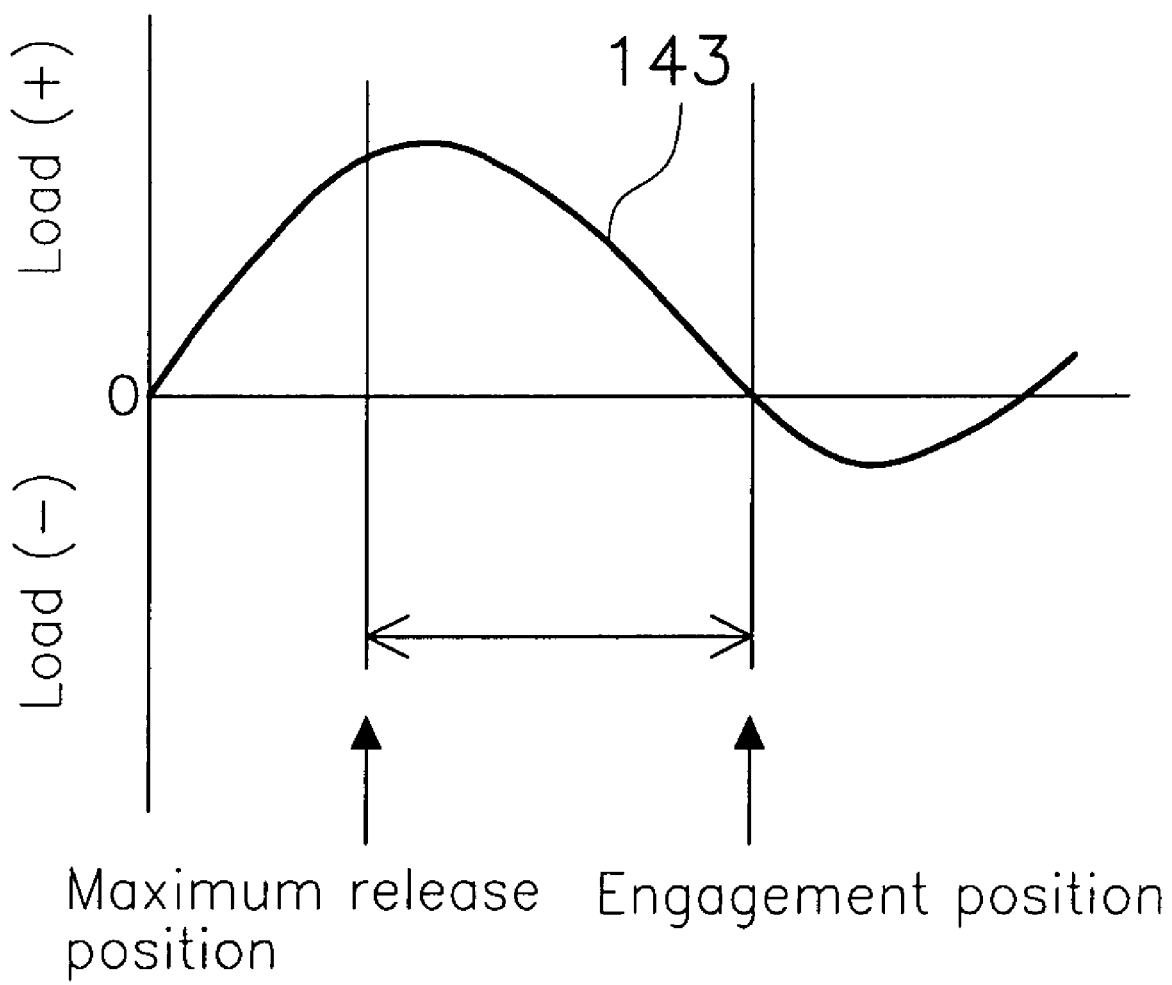
FIG. 11 is a view of a graph illustrating a load characteristic of the second low release load characteristic achieving mechanism.

Consequently, the cone spring 136 can apply a load to an assembly including the holder 132 and so on toward the transmission in the axial direction. Unlike the above-mentioned embodiment, however, the second low release load characteristic achieving mechanism 130 does not include an elastic member equivalent with the second cone spring 37. Accordingly, the load characteristic 143 of the second low release load characteristic achieving mechanism 130 that corresponds to the composite load characteristic (FIG. 7) in the first embodiment is shown in FIG. 11. In this case, as shown in FIG. 11, the load is set so that it will be zero when the clutch is engaged. Furthermore, as in the above-described embodiment, the second low release load characteristic achieving mechanism 130 has a function of reducing the release load by applying a load to the holder 132 and so on toward the transmission in the axial direction during the clutch release operation.

The second low release load characteristic achieving mechanism 130 includes only one first cone spring 36, that is, the number the cone springs is fewer than that in the above-described embodiment by three. As a result, the axial dimension of the second low release load characteristic achieving mechanism 130 is further shortened so that the second low release load characteristic achieving mechanism 130 does not protrude outward from the clutch cover 102, thereby further shortening the axial dimension of the clutch cover assembly.

Since the number the cone springs is fewer, it is possible to simplify the structure of the holder 132 and further reduce the number of components.

The detailed explanation of the operation of the second low release load characteristic achieving mechanism 130 is omitted because it is the same as or similar to that of the first embodiment.

Third Embodiment (1) Overall Structure of a Clutch Cover Assembly

Figure 12:
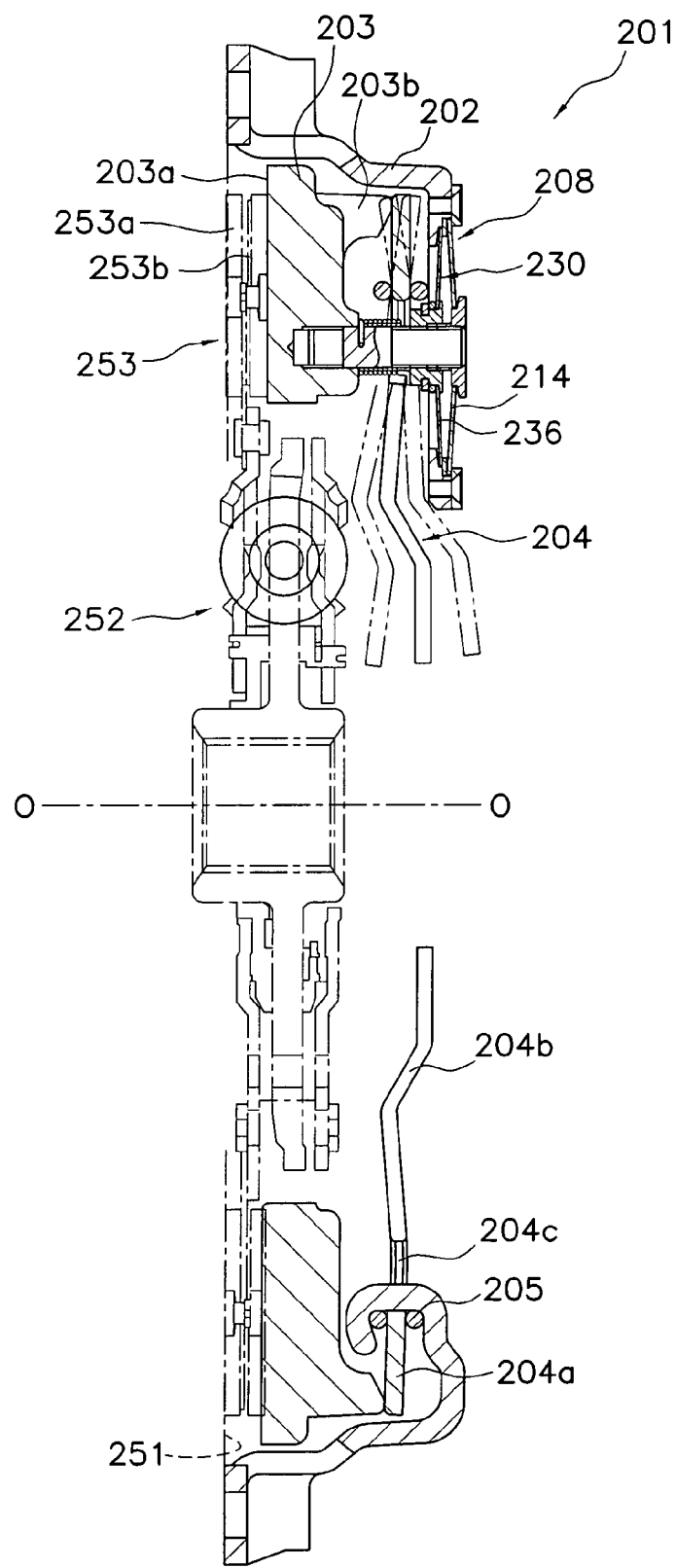
FIG. 12 is a longitudinal cross-sectional schematic view of a clutch cover assembly according to the third preferred embodiment of the present invention.
Figure 13:
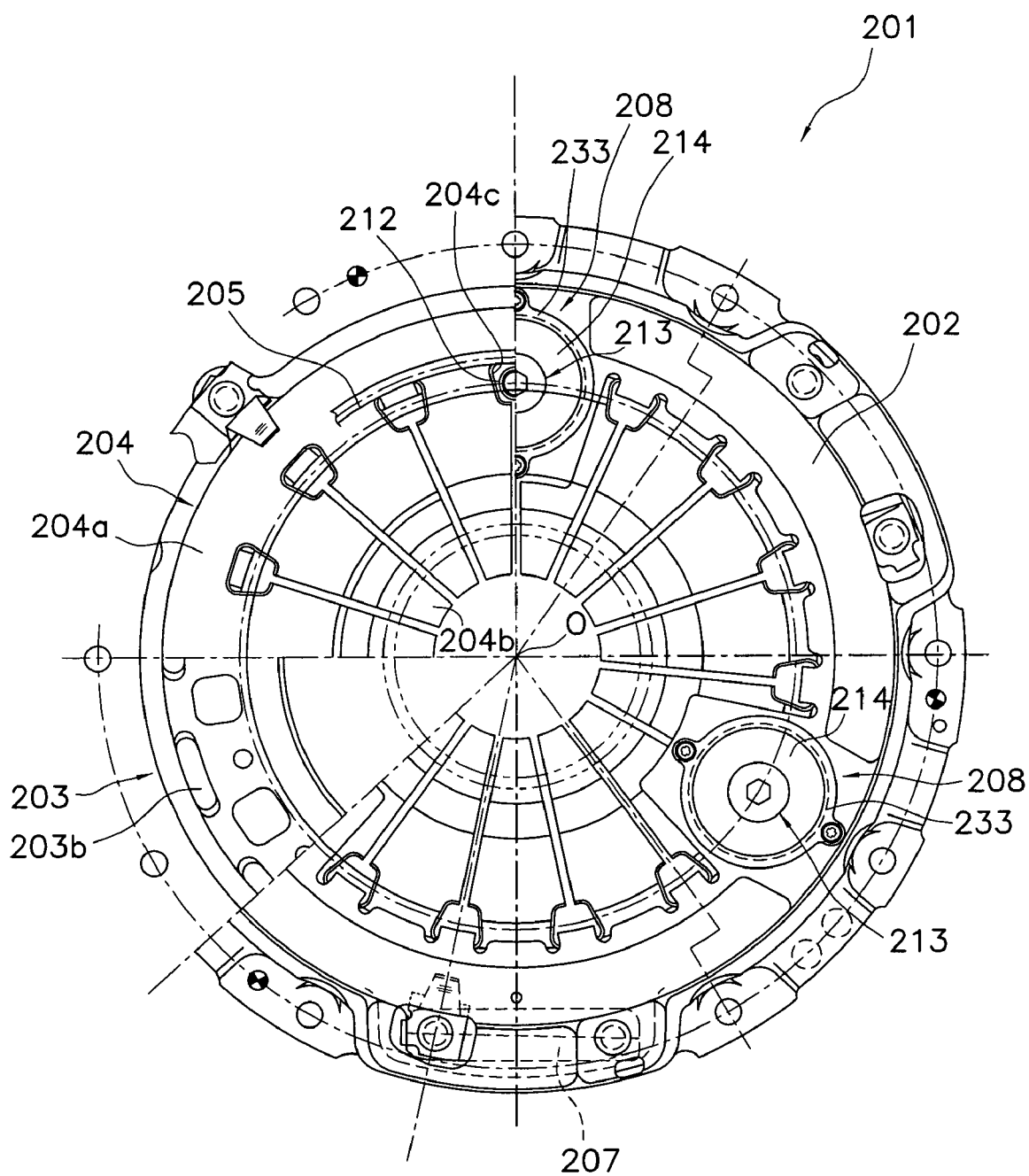
FIG. 13 is an elevational schematic view of a clutch cover assembly according to the third embodiment of the present invention with portions removed for illustrative purposes.

A push-type diaphragm spring clutch cover assembly 201 shown in FIG. 12 to FIG. 13 is provided to engage a clutch by pressing a friction member 253 of a clutch disc assembly 252 against a flywheel 251 of an engine, or to disengage a clutch by releasing the pressing load in accordance with a third preferred embodiment of the present invention. The friction member 253 has friction facings 253a and cushioning plates 253b so that it has a cushioning function of deflecting within a certain range in an axial direction.

A line O-O shown in FIG. 12 is a rotational axis of the flywheel 251 and the clutch cover assembly 201. The left side in the figures will be referred to as the "axial engine-side," and the right side in figures will be referred to as the "axial transmission-side."

The clutch cover assembly 201 mainly has a clutch cover 202, a pressure plate 203, and a diaphragm spring 204.

The clutch cover 202 is an approximately dish-shaped plate member, and has a radially outer end fixed to the flywheel 251 by bolts, for example. The clutch cover 202 has a disc portion opposite a radially outer portion of the flywheel 251 with a gap therebetween in the axial direction.

The pressure plate 203 is preferably an annular member that is formed with a pressing surface 203a facing the flywheel 251. The friction member 253 of the clutch disc assembly 252 is provided between the pressing surface 203a and the flywheel 251. The pressure plate 203 is formed with a plurality of protrusions 203b that protrudes in the axial direction opposite of the pressing surface 203a. As seen in FIG. 13, the pressure plate 203 is connected with the clutch cover 202 by a plurality of strap plates 207 so that it can move relative to the clutch cover 202 in the axial direction but not in the rotational direction.

Referring again to FIG. 12, the diaphragm spring 204 is a disc-like member that is located between the pressure plate 203 and the clutch cover 202. The diaphragm spring 204 has an annular elastic portion 204a and a plurality of lever portions 204b extending radially inward from an inner periphery of the annular elastic portion 204a. The annular elastic portion 204a has a radially inner portion that is in contact with the protrusions 203b of the pressure plate 203. The annular elastic portion 204a has a radially outer portion that is supported by the clutch cover 202 via wire rings 205. In this state, the annular elastic portion 204a urges the pressure plate 203 toward the flywheel 251. As seen in FIG. 13, slits are formed between the lever portions 204b of the diaphragm spring 204, with each slit having an oval hole 204c at the radially outer end. A pull-type release device (not shown), including a release bearing and so on, is engaged with tips of the lever portions 204b of the diaphragm spring 204.

(2) First Low Release Load Characteristic Achieving Mechanism

Next, a description will be made on a first low release load characteristic achieving mechanism 208 referring to FIGS. 12 and 13. The first low release load characteristic achieving mechanism 208 is a mechanism that can realize low release load characteristics even if the friction member 253 is worn progressively by flattening the pressing load characteristics. As shown in FIG. 13, three mechanisms 208 are preferably arranged in the circumferential direction in the clutch cover assembly 201.

Figure 14:
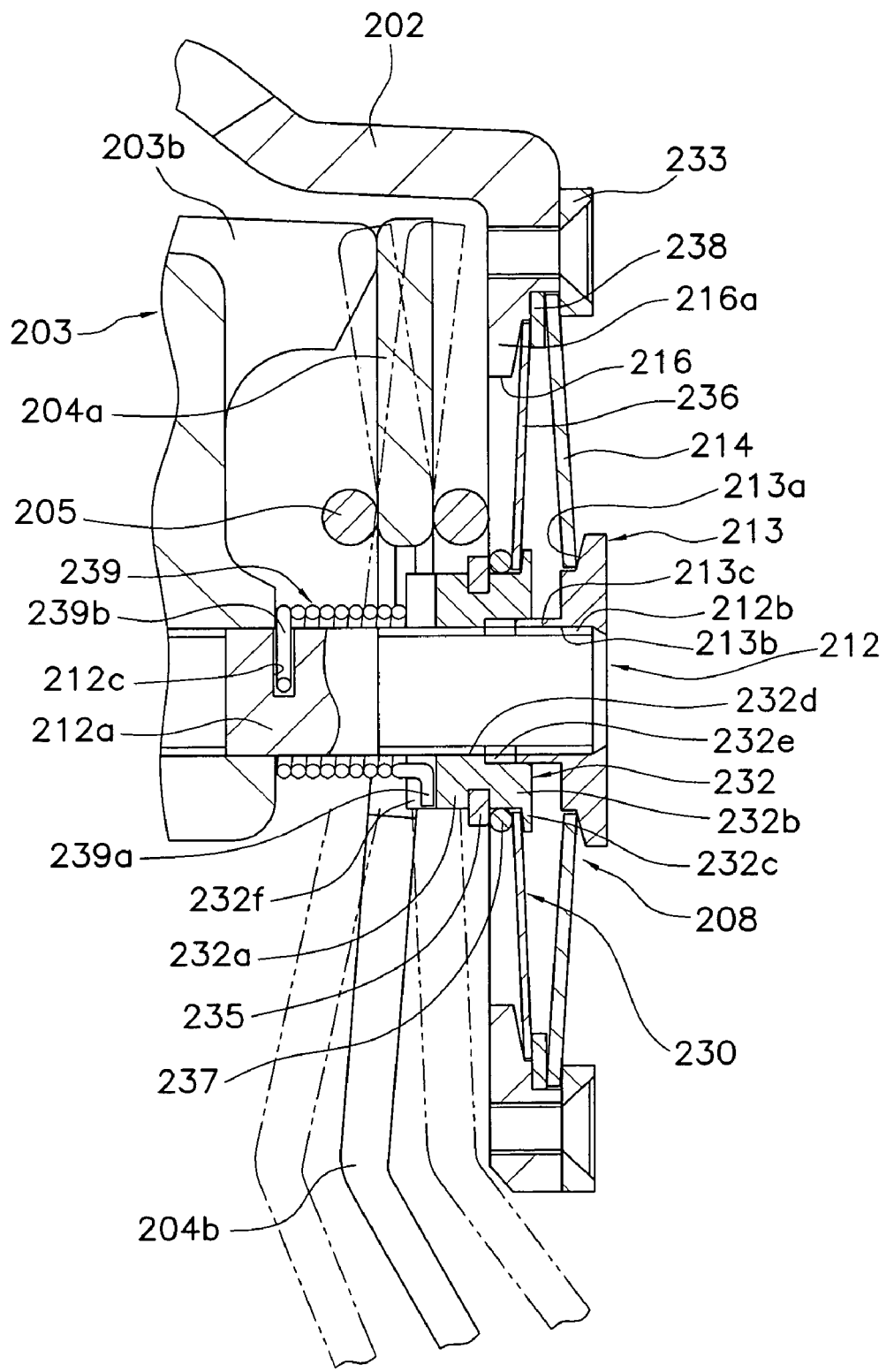
FIG. 14 is a longitudinal cross-sectional schematic view of first and second low release load characteristic achieving mechanisms of the clutch cover assembly of the third embodiment.

As shown in FIG. 14, the mechanism 208 is made of a support bolt 212 (support member), a spring seat 213 (first support and engagement member), and a cone spring 214 (first elastic member). The support bolt 212 is fixed to the pressure plate 203, and extends from a radially inner portion of a surface of the pressure plate 203 on which the protrusions are formed toward the transmission in the axial direction. The support bolt 212 has a base 212a and a screw portion 212b. The base 212a of the support bolt 212 penetrates the oval hole 204c of the diaphragm spring 204 and extends further in the axial direction. The screw portion 212b of the support bolt 212 is a portion having a surface on which a spiral screw is formed, and is located on the axial transmission-side of the base 212a. The clutch cover 202 is formed with holes 216 corresponding to the support bolts 212. The hole 216 is circular and larger than the oval hole 204c. The screw portion 212b extends through the hole 216 in the axial direction and has one end on which the spring seat 213 is screwed.

The spring seat 213 is an annular member and has a tapered face 213a, a screw portion 213b, and a tubular portion 213c. The tapered face 213a is an annular surface facing the engine in the axial direction, and supports the inner circumferential periphery of the cone spring 214 in the axial direction. The tubular portion 213c is a tubular portion extending toward the engine in the axial direction, and has an inner circumference on which the screw portion 213b is formed that would be screwed with the screw portion 212b of the support bolt 212.

When the clutch is not worn during the clutch engagement operation, the cone spring 214 does not generate a load. In contrast, referring to FIGS. 12 and 14, when the friction member 253 of the clutch disc assembly 252 is worn, the pressure plate 203 and the support bolt 212 move relative to the clutch cover 202 toward the engine in the axial direction. Accordingly, the cone spring 214 is compressed between the clutch cover 202 and the spring seat 213 to provide a load to both members 202 and 212. The load that the cone spring 214 gives to the support bolt 212 and others counteracts the pressing load that the diaphragm spring 204 provides to the pressure plate 203 so that the pressing load of the diaphragm spring 204 can be reduced, thereby reducing the release load as well (later described).

Figure 15:
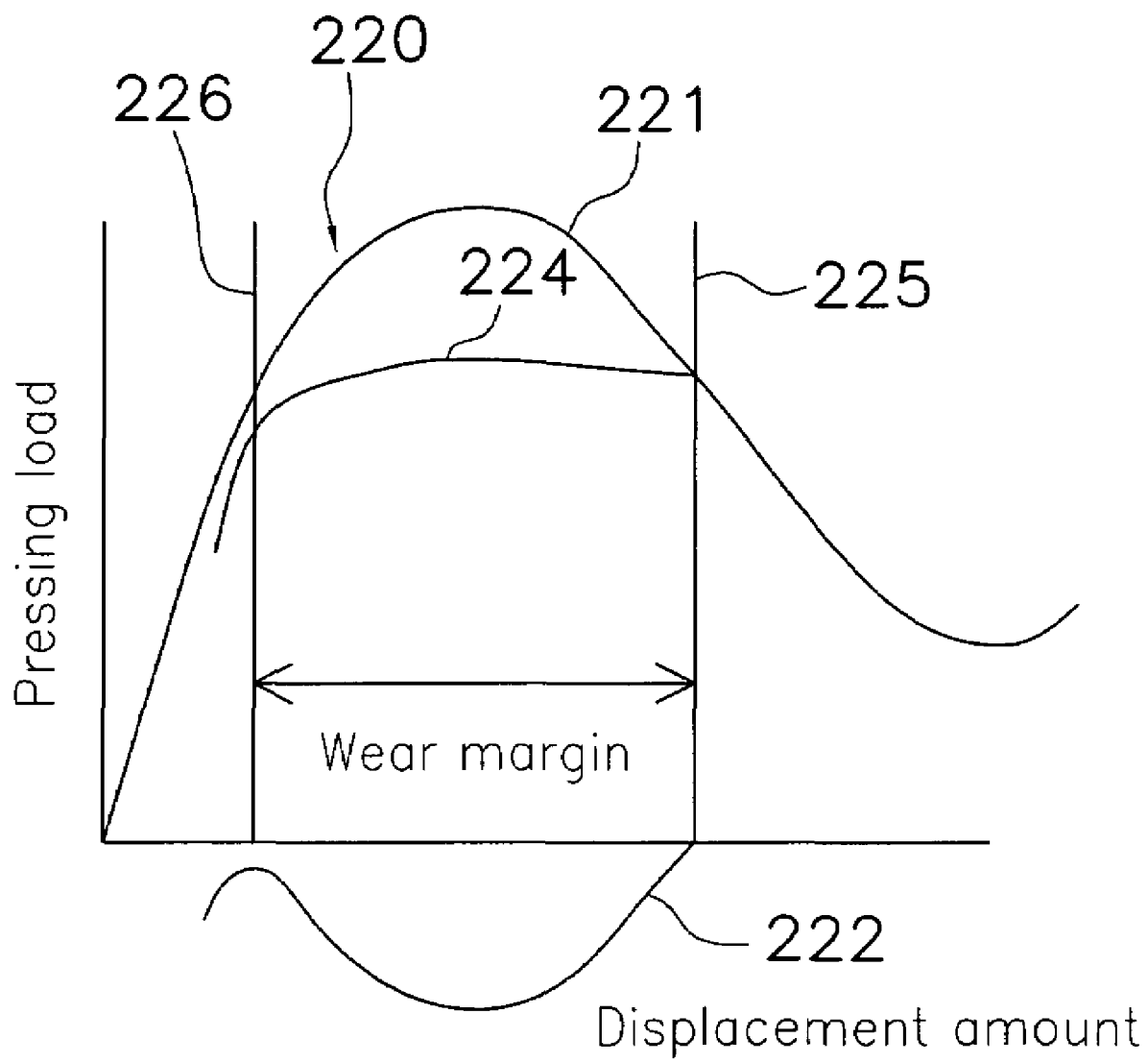
FIG. 15 is a view of a graph illustrating the pressing load characteristics of the clutch cover assembly of the third embodiment.

A description will be made on pressing load characteristics in FIG. 15. The characteristic 220 of the diaphragm spring 204 has the wear line 226, the peak 221, and the set line 225, as described above. In contrast, the characteristic 222 of the cone spring 214 of first low release load characteristic achieving mechanism 208 have an opposite peak to cancel the peak 221 (a portion convex downward) to form a composite load flat portion 224. As a result, the clutch pedal pressure changes little when the friction member 253 is worn compared to a situation in which it is not worn, thereby improving the maneuvering feeling at the release operation.

(3) Second Low Release Load Characteristic Achieving Mechanism

Referring to FIG. 12 through FIG. 14, a description will be made on a second low release load characteristic achieving mechanism 230. The second low release load characteristic achieving mechanism 230 is a release assist mechanism to realize a release load lowering by a cushioning function in the friction member 253 even if the friction member 253 is worn. In other words, the second low release load characteristic achieving mechanism 230 includes a low release load mechanism and a wear compensation mechanism.

Figure 18:
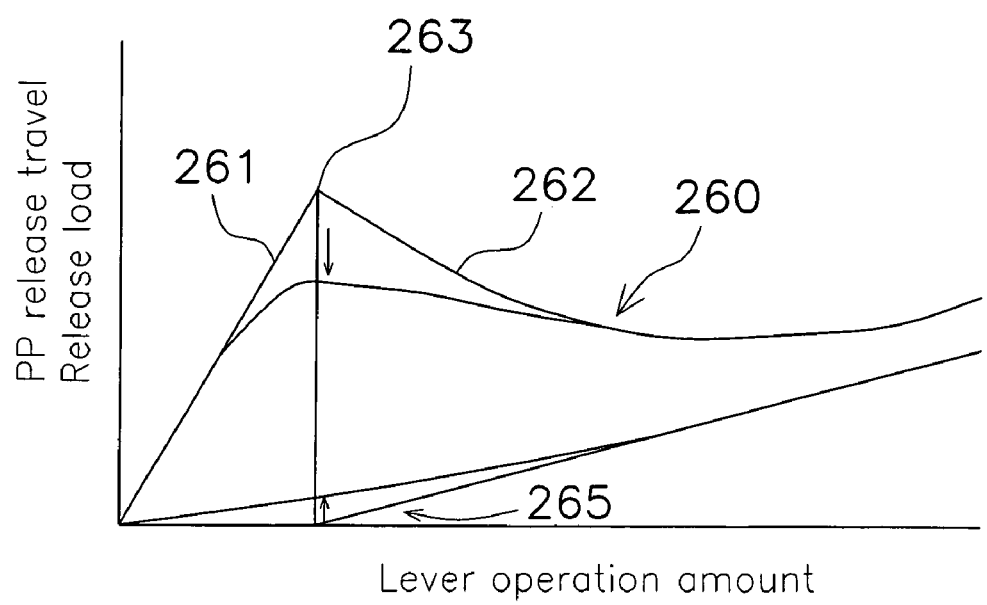
FIG. 18 is a view of a chart illustrating the release load characteristics for the clutch cover assembly of the third embodiment.

First, referring to FIG. 18, the release load lowering by the cushioning function of the friction member will be described. In a case with no cushioning function, the release load characteristic 260 linearly increases 261 to a peak, i.e., a load balance point 263, gradually decreases 262 from the peak, and then gradually increases. It should be noted that the clutch release travel 265 of the pressure plate is zero up to the load balance point 263. If the friction member has a cushion function, the movement of the pressure plate becomes faster at the release operation, more specifically, the clutch release travel 265 of the pressure plate increases faster compared to a case with no cushioning plate. In FIG. 18, the peak at the load balance point 263 is decreased to a large extent, thereby realizing low release load characteristics. The reason why the above-mentioned result is obtained is that a position of the pressure plate moves during a release operation in a negative gradient direction (right direction) in the pressing load characteristics in FIG. 15. Accordingly, if the position of the set line is changed because of the wear of the friction member, the pressure plate may move during the release operation travel through the flat portion or the positive gradient portion. Therefore, the second low release load characteristic achieving mechanism 230 makes it possible for the pressure plate to move in a negative gradient direction in the load characteristic even if the friction member is worn.

The second low release load characteristic achieving mechanism 230 and the first low release load characteristic achieving mechanism 208 are arranged in the axial direction as shown in FIGS. 12 through 14, more specifically they are located coaxially. The three second low release load characteristic achieving mechanisms 230 are arranged in the circumferential direction, and are positioned in the same position in the circumferential direction and the radial direction as the first low release load characteristic achieving mechanism 208.

As shown in FIG. 14, the low release load characteristic achieving mechanism 230 includes a holder 232 (second support and engagement member), a cone spring 236 (second elastic member), a snap ring 235, a support ring 237, and an adjust spring 239. (third elastic member).

Referring to FIGS. 12 and 14, the holder 232 is a member that receives a load from the cone spring 236 in the axially opposite direction of the friction member 253, and is located between the spring seat 213 and the pressure plate 203. The holder 232 includes a holder main body 232a, a tubular portion 232b, and a flange portion 232c. The holder main body 232a is an annular portion extending cylindrically in the axial direction, and has an inner circumference formed with a screw 232d to be threadedly engaged with the screw portion 212b of the support bolt 212.

The tubular portion 232b is preferably an annular portion extending radially outward from an axial transmission-side end of the holder main body 232a, and is integrally molded with the holder main body 232a. A gap 232e is formed between the tubular portion 232b and the support bolt 212. One end of the tubular portion 213c of the spring seat 213 is fitted into the gap from the transmission side in the axial direction. The flange portion 232c is preferably an annular portion formed on the axial transmission-side end of the tubular portion 232b, and extends radially outward from the end of the tubular portion 232b.

The cone spring 236 is a member that applies a load via the holder 232 to the pressure plate 203 toward the transmission in the axial direction, and is located coaxially between the cone spring 214 of the mechanism 208 and the pressure plate 203 in the axial direction. More specifically, the cone spring 236 is attached to the outer circumference of the tubular portion 232b of the holder 232, and has an inner circumferential periphery in contact with the flange portion 232c of the holder 232 from the engine side in the axial direction. The snap ring 235 is fitted around the outer circumference of the holder main body 232a. The inner circumferential periphery of the cone spring 236 and the annular support ring 237 are sandwiched between the snap ring 235 and the flange portion 232c of the holder 232. In other words, the inner circumferential periphery of the cone spring 236 is supported in the axial direction by a structure constituted by the holder 232 and so on.

The outer periphery of the cone spring 236 is in contact with an annular protrusion 216a formed around the hole 216 in the clutch cover 202 from the transmission side in the axial direction. An annular intermediate plate 238 (intermediate member) is sandwiched in the axial direction between the outer periphery of the cone spring 236 and the outer periphery of the cone spring 214. Since the outer diameter of the cone spring 236 is a little bit smaller than that of the cone spring 214 in this embodiment, the inner circumferential periphery of the intermediate plate 238 and the inner circumferential periphery of the cone spring 236 are in contact with each other in the axial direction, and the outer periphery of the intermediate plate 238 and the outer periphery of the cone spring 214 are in contact with each other. A securing ring 233 that is fixed to the clutch cover 202 is located on the axial transmission-side of the cone spring 214. The cone spring 214, the intermediate plate 238, and the cone spring 236 are sandwiched between the securing ring 233 and the annular protrusion 216a of the clutch cover 202. In other words, the outer periphery of the cone spring 236 is supported by the clutch cover 202 in the axial direction.

As described above, the cone spring 236 can apply the load to the pressure plate 203 toward the transmission in the axial direction via the structure constituted by the holder 232 and so on.

The adjust spring 239 is a torsion coil spring that realizes a wear compensation mechanism, and is located between the clutch cover 202 and the pressure plate 203 in the axial direction, more specifically, on a side of the holder 232 toward the engine in the axial direction (near the friction member 253). The adjust spring 239 is fitted around the body portion 212a of the support bolt 212, and a first engagement end 239a of the adjust spring 239 is engaged with an engagement portion 232f of the holder 232. A second engagement end 239b of the adjust spring 239 is fitted into a hole 212c of the support bolt 212 so that the adjust spring 239 is attached to the support bolt 212. In other words, when the adjust spring 239 is wound up, the adjust spring 239 applies a substantially constant load to the holder 232 in one rotational direction. In this case, the load applying direction of the adjust spring 239 is a direction in which the holder 232 moves toward the transmission in the axial direction along the screw portion 212b.

As is apparent from the above-described configuration, the cone spring 214 of the mechanism 208 and the cone spring 236 of the mechanism 230 are located coaxially. Accordingly, it is unnecessary to position the peak cut mechanism and the low release load mechanism at different positions in the circumferential direction and radial direction as in the clutch cover of FIG. 21. As a result, it is possible to reduce the installation spaces and to downsize a clutch cover assembly having a peak cut mechanism and a low release load mechanism.

Furthermore, the first low release load characteristic achieving mechanism 208 and the second low release load characteristic achieving mechanism 230 share the support bolt 212 and the securing ring 233. Accordingly, when compared to an example of the clutch cover of FIG. 21, it is possible to reduce the number of components and the cost of manufacturing.

Furthermore, since the intermediate plate 238 is sandwiched between the outer periphery of the cone spring 214 and the outer periphery of the cone spring 236 in the axial direction, it is possible to ensure a space between the cone springs 214 and 236 in the axial direction with the intermediate plate 238. As a result, even if the wear compensation mechanism is operated to move the axial position of the cone spring 236 toward the cone spring 214, it is possible to prevent the cone spring 214 from getting into contact with the cone spring 236. In addition, even if the outer diameter of the cone spring 236 is smaller than that of the cone spring 214 as in the present embodiment, it is possible to support reliably the cone spring 236 via the cone spring 214 and the intermediate plate 238.

Figure 16:
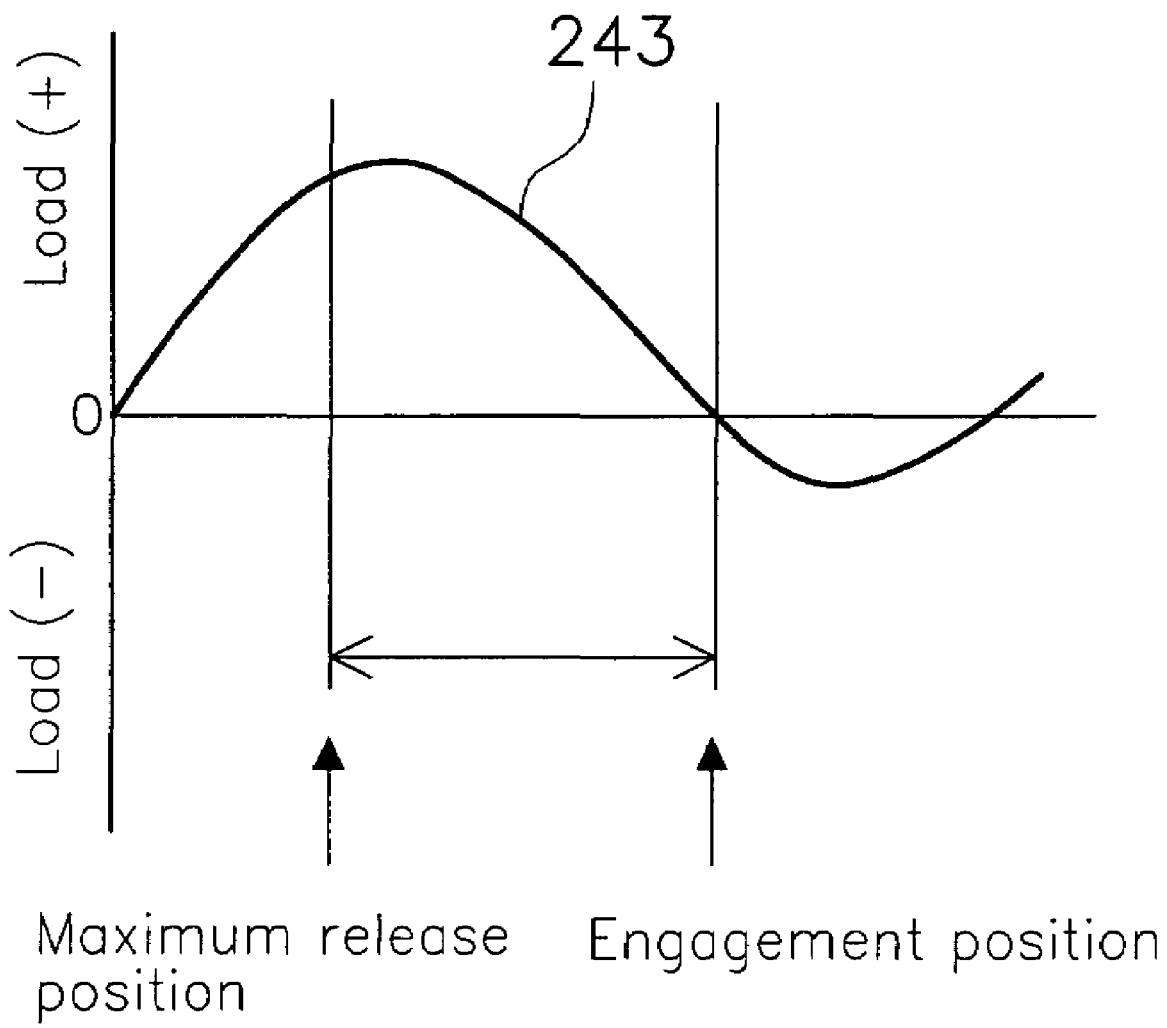
FIG. 16 is a view illustrating composite characteristics of the second low release load characteristic achieving mechanism of the clutch cover assembly of the third embodiment.
Figure 17:
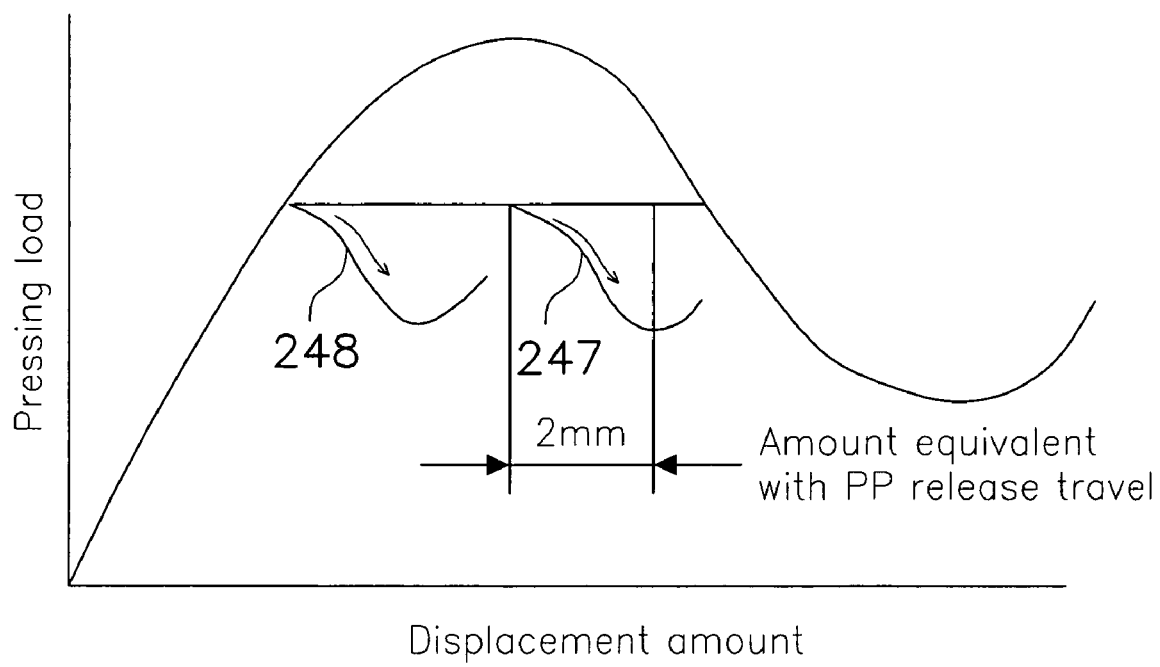
FIG. 17 is a view illustrating a negative gradient characteristic that is gained when the cushioning function is fulfilled in the set load characteristic for the clutch cover assembly of the third embodiment.

The operation of the second low release load characteristic achieving mechanism 230 will be described. As shown in FIG. 16, the characteristic 243 of the first cone springs 236 generates a load toward the positive side (toward the transmission in the axial direction) between the clutch engagement position and the maximum release position. The peak and the bottom in the characteristic 243 of the cone spring 236 differ greatly. The inclined portion between the peak and the bottom are positioned at the clutch engagement position so that the load there is zero. Preferably, the bottom load of the characteristics 242 is designed to be zero or lower. As the characteristic shifts from the zero load point toward the maximum release position, the load increases gradually toward the positive side. This phenomenon is seen in the set load characteristic in FIG. 17: when the release operation is performed after the friction member 253 is worn, the cushion function of the friction member 253 shifts the set line toward the maximum displacement magnitude like the lines 247 and 248. In other words, negative gradient is always ensured in the pressing characteristic so that the release load lowering can be reliably realized by the cushion function.

In a clutch engagement state, a force (torque) to rotate the holder 232 by the adjust spring 239 and the friction force at the screw faces by the load (axial load) of the cone springs 236 are balanced. Consequently, in this state, the axial load to the support bolt 212 has a value a little bit larger than zero. When the friction member 253 is worn, the support bolt 212 and the holder 232 move toward the engine in the axial direction. Then, the cone spring 236 is deformed further, and the loads of these components are lowered to zero. At this time, the adjust spring 239 rotates the holder 232 to move it toward the engine in the axial direction. Then, the axial composite load by the cone springs 236 increases, and the friction force at the screw face shows a proportional increase. As a result, it becomes impossible to rotate the holder 232 by the torque of the adjust spring 239, and the holder 232 stops the axial movement. As mentioned before, even if the friction member 253 is worn, the postures of the cone springs 236 in the second low release load characteristic achieving mechanism 230 return to the initial states. In other words, the second wear compensation mechanism is realized in the second low release load characteristic achieving mechanism 230, therefore the postures of the cone springs 236 maintain, even if the friction member 253 is worn, a constant load of the second low release load characteristic achieving mechanism 230.

(4) Clutch Engagement Operation and Release Operation

Referring to FIG. 12, in this clutch cover assembly 201, in a state that the release device (not shown) does not apply the load to the tips of the lever portions 204b of the diaphragm spring 204, the annular elastic portion 204a applies the pressing load to the pressure plate 203. As a result, the friction member 253 of the clutch disc assembly 252 is pressed against the flywheel 251 so that torque is transmitted to the clutch disc assembly 252 (in a clutch engagement state).

When a release device (not shown) pulls out the tips of the lever portions 204b of the diaphragm spring 204 toward the transmission, the radially inner portion of the annular elastic portion 204a of the diaphragm spring 204 is pulled up toward the transmission in the axial direction at the wire ring 205 as a fulcrum. By this operation, the annular elastic portion 204a no longer presses the pressure plate 203, the pressure plate 203 is separated from the friction member 253 by the strap plates 207, and finally the friction member 253 leaves the flywheel 251 (in a clutch disengagement state).

(5) Effects of the Present Invention

Effects of the present invention will be described as following.

In the clutch cover assembly 201, since the cone spring 214 and the cone spring 236 are arranged in the axial direction, it is unnecessary to locate the first and second low release load characteristic achieving mechanisms at different positions in the circumferential direction and the radial direction as in the above-described first and second embodiments. As a result, it is possible to downsize the first low release load characteristic achieving mechanism 208 and the second low release load characteristic achieving mechanism 230. It is also possible to reduce the installation spaces of the mechanisms, thereby downsizing the clutch cover assembly 1 having the peak cut mechanism and the low release load mechanism.

Furthermore, since the first low release load characteristic achieving mechanism 208 and the second low release load characteristic achieving mechanism 230 are located coaxially in the clutch cover assembly 201, they can share components. As a result, it is possible to reduce the number of components and the cost of manufacturing in the clutch cover assembly 201.

Fourth Embodiment

Figure 19:
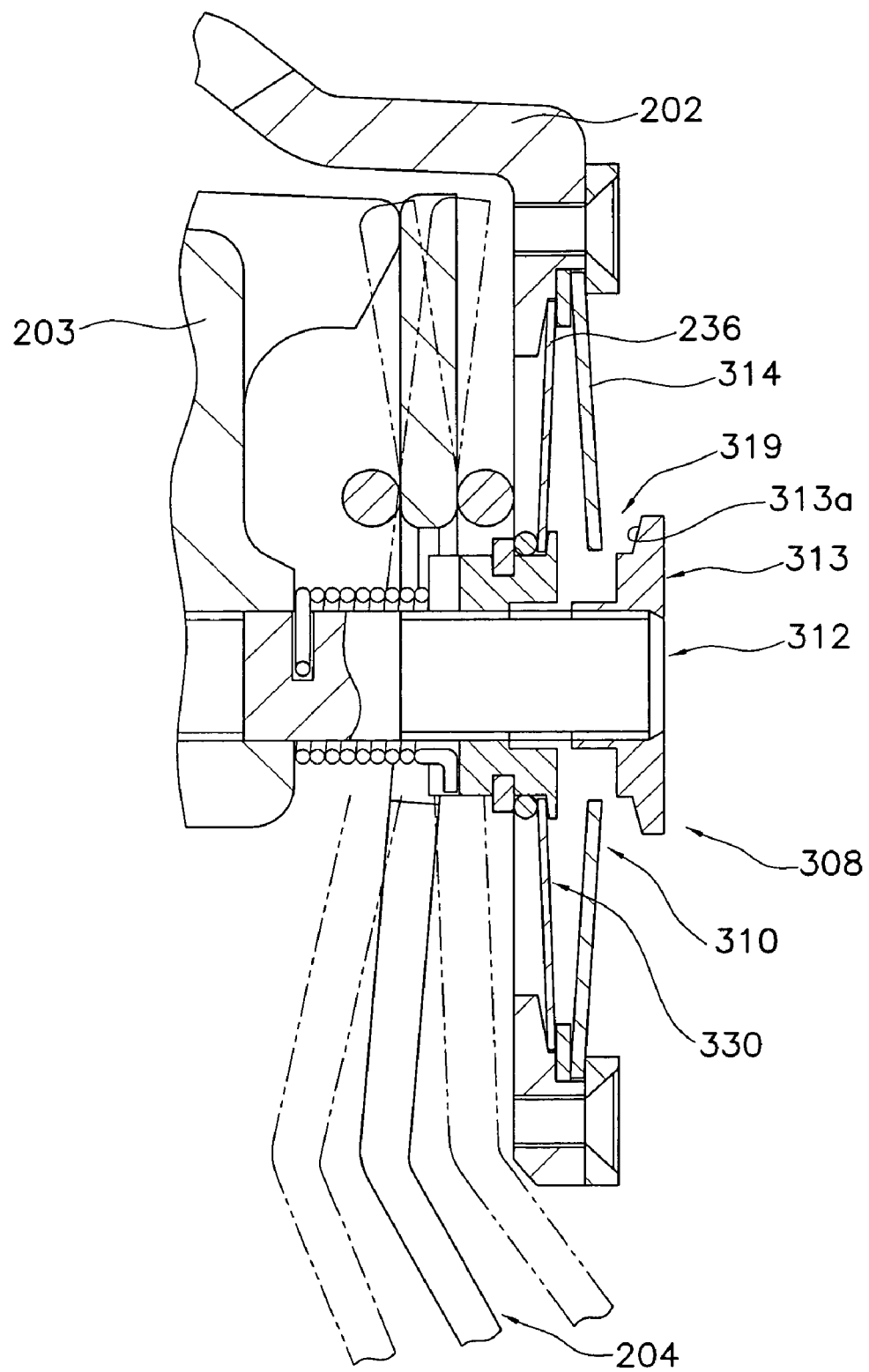
FIG. 19 is a longitudinal cross-sectional schematic view of a second unit of a first low release load characteristic achieving mechanism according to a clutch cover assembly of the fourth preferred embodiment of the present invention.

With reference to FIG. 19, a description will be made on a first low release load characteristic achieving mechanism 308 according to the fourth embodiment of the present invention. The first low release load characteristic achieving mechanism 308 is a mechanism that realizes functions similar to those of the mechanism 208 of the third embodiment, and is provided in a clutch cover 302. FIG. 19 represents a clutch engagement state. It should be noted that the same components are identified by the same reference marks as those in the third embodiment.

The first low release load characteristic achieving mechanism 308 in the present embodiment is made of first units 208 and second units 310. The first and second units 208 and 310 are alternately arranged in the circumferential direction. In the present embodiment, the first low release load characteristic achieving mechanism 308 preferably includes two first units 208 and two second units 310, for example. In this case, four second low release load characteristic achieving mechanisms 330 are respectively located coaxially with the first and second units 208 and 310.

Figure 20:
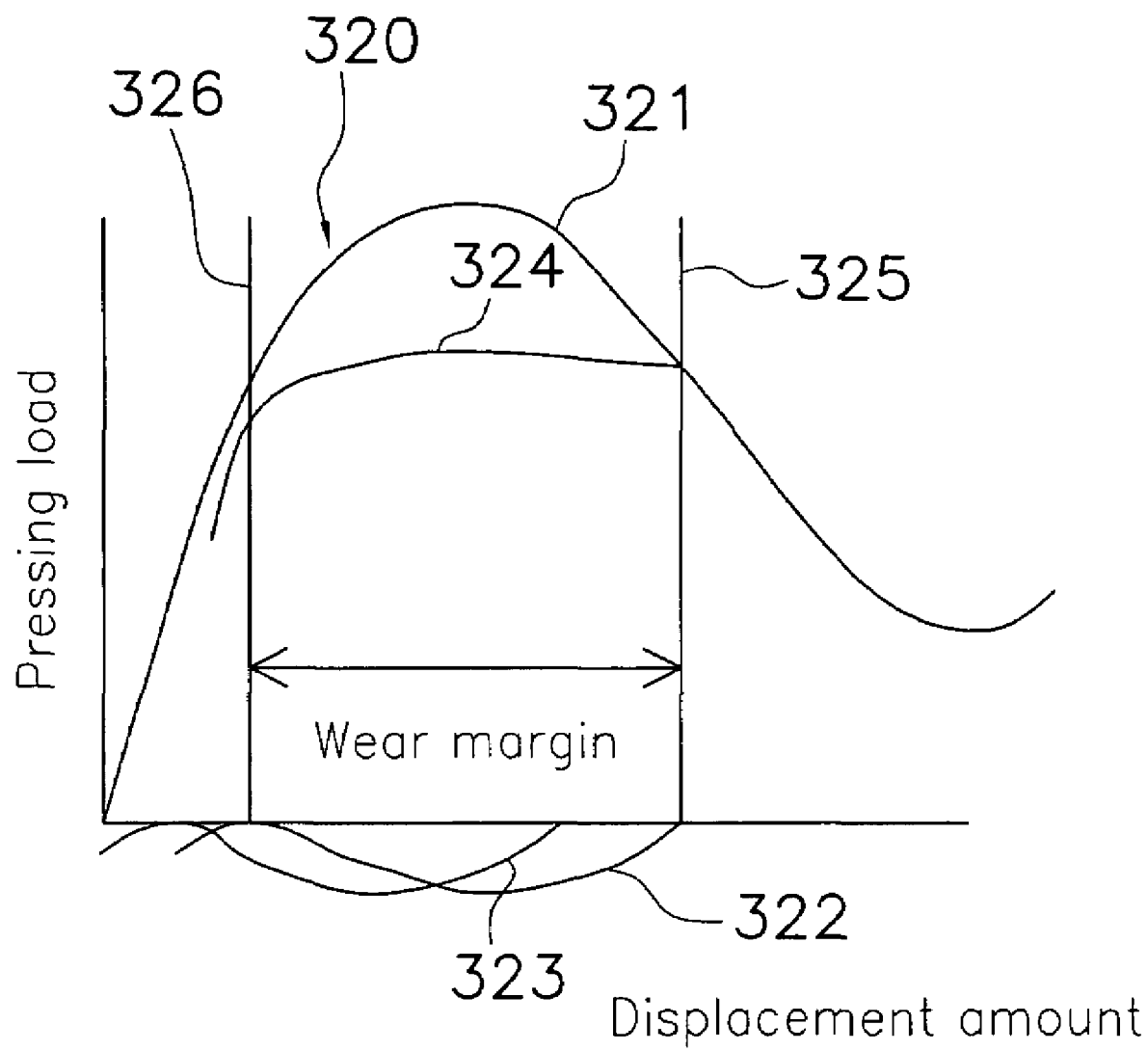
FIG. 20 is a view of a graph illustrating the pressing load characteristics of the clutch cover assembly of the fourth embodiment.

Although the first unit 208 of this embodiment has the same or similar structure as that of the mechanism 208 in the above-described embodiment, the load characteristics of the cone springs 214 are different from each other as shown in FIG. 20. It should be noted that a detailed description on the first unit 208 will be omitted.

As shown in FIG. 19, the second unit 310 is made of a support bolt 312 and a spring seat 313. The support bolt 312 extends from the pressure plate 203 toward the transmission in the axial direction. The support bolt 312 has one end on which the spring seat 313 is screwed. The spring seat 313 has an annular tapered face 313a facing the engine in the axial direction. As shown in FIG. 19, the support bolt 312 is preferably longer than the above-described support bolt 212, and protrudes further from the clutch cover 202 toward the transmission in the axial direction. A gap 319 is defined between the tapered face 313a of the spring seat 313 and the inner circumferential periphery of the cone spring 314.

Consequently, referring to FIGS. 12 and 19, at the initial stage of wear of the friction member 253, the cone spring 314 of the second unit 310 does not generate a load. In other words, the time at which compression of the cone spring 314 of the second unit 310 starts is shifted from that of the cone spring 14 of the first unit 208 in accordance with the time it takes for the gap 319 to be closed.

A description will be made on pressing load characteristics in FIG. 20. The characteristic 320 of the diaphragm spring 204 has the wear line 326, the peak 321, and the set line 325, as described above. In contrast, the characteristic 322 of the cone spring 214 of the first unit 208 and the characteristic 323 of the cone spring 314 of the second unit 310 have opposite peaks to cancel the peak 321 (portions convex downward) to form a composite load flat portion 324. More specifically, the cone spring 214 of the first unit 208 generates a load from the set line 325, and has a bottom positioned at the end of a margin of wear. The cone spring 314 of the second unit 310 generates the load from a point shifted from the set line 325 to some extent, and has a bottom shifted from the end of a margin of wear to some extent. Accordingly, since two kinds of the cone springs are combined for use, it is possible to realize the composite load flat portion 324, which ensures the sufficiently large margin of wear. As a result, the clutch pedal pressure changes little when the friction member 253 is worn compared to a situation in which it is not worn, thereby improving the maneuvering feeling at the release operation.

As described above, in the first low release load characteristic achieving mechanism 308 of the present embodiment, the cone springs 236 and 314 are arranged in the circumferential direction, and they are set to start to generate loads at different times in response to the change in displacement magnitude of the diaphragm spring 204. Consequently, in the clutch cover assembly 201, by using the cone springs 236 and 314 that are arranged to start to generate loads at different times, it is possible to realize preferable pressing load characteristics. In addition, since the basic structure of this embodiment is the same as that of the above-described third embodiment, it is also possible to achieve functions and effects such as downsizing and the reduction in the number of components in a clutch cover assembly 201 of the present embodiment as in the case of the third embodiment.

Other Embodiments

The above-described embodiments are examples of the present invention, and various changes can be made within the scope of the present invention. For example, although in the embodiments pull-type clutch cover assemblies are employed, the present invention can be applied to push-type clutch cover assemblies.

Specific structures of the first low release load characteristic achieving mechanism and the second low release load characteristic achieving mechanism in the above-described first and second embodiments can be changed. Especially, the first low release load characteristic achieving mechanism can be a structure being made of one cone spring.

Furthermore, although the second low release load characteristic achieving mechanism 130 in the second embodiment is made of one cone spring, it may be made of a plurality of cone springs as in the case of first embodiment.

In the above-described third and fourth embodiments, the first low release load characteristic achieving mechanism may be a plurality of cone springs combined in the axial direction. Much the same is true one the second low release load characteristic achieving mechanism.

Furthermore, although three first and second low release load characteristic achieving mechanisms are provided in the above-described third and fourth embodiment, locations, the number and so on are not limited to ones in the embodiments.

The term "configured" as used herein to describe a component, section, or part of a device includes hardware and/or software that is constructed and/or programmed to carry out the desired function.

Moreover, terms that are expressed as "means-plus function" in the claims should include any structure that can be utilized to carry out the function of that part of the present invention.

In understanding the scope of the present invention, the term "configured" as used herein to describe a component, section, or part of a device that is constructed to carry out the desired function. Also, the terms "part," "section," "portion," "member," or "element" when used in the singular can have the dual meaning of a single part or a plurality of parts. Terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A clutch cover assembly for pressing a friction member of a clutch disc assembly with a cushioning function against a flywheel of an engine and for releasing the pressing, comprising:

a clutch cover being configured to be fixed to the flywheel;

a pressure plate being non-rotatably fixed to said clutch cover to sandwich the friction member between the flywheel and itself;

a diaphragm spring being supported by said clutch cover to urge said pressure plate toward the flywheel;

a first elastic member being supported by said clutch cover to generate a load counteracting an urging force of said diaphragm spring such that change in the pressing load to said pressure plate in response to displacement magnitude of said diaphragm spring is decreased;

a second elastic member being supported by said clutch cover to generate a load counteracting an urging force of said diaphragm spring during a release operation such that pressing load to said pressure plate is progressively decreased as displacement magnitude of said diaphragm spring is increased by the cushioning effect of the friction member; and a wear compensation mechanism maintaining a posture of said second elastic member in response to wear of the friction member, said wear compensation mechanism including a support member extending from said pressure plate toward said clutch cover, a support and engagement member being threadedly engaged with the outer circumference of said support member and being given a load from said second elastic member in an axial direction away from the friction member, and a third elastic member constantly applying torque to said support and engagement member so that said support and engagement member rotates to move in an axial direction away from the friction member, said third elastic member being located on a side of said support and engagement member near the friction member in the axial direction.

2. The clutch cover assembly according to claim 1, wherein said third elastic member is located between said clutch cover and said pressure plate in the axial direction.

3. The clutch cover assembly according to claim 1, wherein said support and engagement member covers an end of said support member.

4. The clutch cover assembly according to claim 1, wherein said support and engagement member includes a support and engagement member main body having a cylindrical shape that is threadedly engaged with the outer circumference of said support member, an annular engagement portion that is formed at one end of said support and engagement member main body and receives torque from said third elastic member, and a head that covers the other end of said support and engagement member main body.

5. The clutch cover assembly according to claim 4, wherein axial cross section of said head has a polygonal shape.

6. The clutch cover assembly according to claim 1, wherein said wear compensation mechanism further includes a guide plate located between said support and engagement member and said third elastic member in the axial direction, one end of said third elastic member being engaged with said guide plate.

7. The clutch cover assembly according to claim 6, wherein said support and engagement member is formed with a first hole with which one end of said third elastic member is engaged, said guide plate is formed with a second hole with which one end of said third elastic member is engaged, and a radial position of said first hole is substantially the same as that of said second hole.

8. A clutch cover assembly for pressing a friction member of a clutch disc assembly with a cushioning function against a flywheel of an engine and for releasing the pressing, comprising:

a clutch cover being configured to be fixed to the flywheel;

a pressure plate being non-rotatably fixed to said clutch cover to sandwich the friction member between the flywheel and itself;

a diaphragm spring being supported by said clutch cover to urge said pressure plate toward the flywheel;

a first elastic member being supported by said clutch cover to generate a load counteracting an urging force of said diaphragm spring such that change in the pressing load to said pressure plate in response to displacement magnitude of said diaphragm spring is decreased;

a second elastic member being supported by said clutch cover to generate a load counteracting an urging force of said diaphragm spring during a release operation such that pressing load to said pressure plate is progressively decreased as displacement magnitude of said diaphragm spring is increased by the cushioning effect of the friction member; and a wear compensation mechanism maintaining a posture of said second elastic member in response to wear of the friction member, said wear compensation mechanism including
  a support member extending from said pressure plate toward said clutch cover,
  a support and engagement member being threadedly engaged with the outer circumference of said support member and being given a load from said second elastic member in an axial direction away from the friction member, and
  a third elastic member constantly applying torque to said support and engagement member so that said support and engagement member rotates to move in an axial direction away from the friction member, said third elastic member being located between said clutch cover and said pressure plate in the axial direction.

9. A clutch cover assembly for pressing a friction member of a clutch disc assembly with a cushioning function against a flywheel of an engine and for releasing the pressing, comprising:
  a clutch cover being configured to be fixed to the flywheel;
  a pressure plate being non-rotatably fixed to said clutch cover to sandwich the friction member between the flywheel and itself;
  a diaphragm spring being supported by said clutch cover to urge said pressure plate toward the flywheel;
  a first elastic member being supported by said clutch cover to generate a load counteracting an urging force of said diaphragm spring such that change in the pressing load to said pressure plate in response to displacement magnitude of said diaphragm spring is decreased;
  a second elastic member being supported by said clutch cover to generate a load counteracting an urging force of said diaphragm spring during a release operation such that pressing load to said pressure plate is progressively decreased as displacement magnitude of said diaphragm spring is increased by the cushioning effect of the friction member; and
  a wear compensation mechanism maintaining a posture of said second elastic member in response to wear of the friction member, said wear compensation mechanism including
    a support member extending from said pressure plate toward said clutch cover,
    a support and engagement member being threadedly engaged with the outer circumference of said support member and being given a load from said second elastic member in an axial direction away from the friction member, and
    a third elastic member constantly applying torque to said support and engagement member so that said support and engagement member rotates to move in an axial direction away from the friction member, said support and engagement member covering an end of said support member.

10. A clutch cover assembly for pressing a friction member of a clutch disc assembly with a cushioning function against a flywheel of an engine and for releasing the pressing, comprising:
  a clutch cover being configured to be fixed to the flywheel;
  a pressure plate being non-rotatably fixed to said clutch cover to sandwich the friction member between the flywheel and itself;
  a diaphragm spring being supported by said clutch cover to urge said pressure plate toward the flywheel;
  a first elastic member being supported by said clutch cover to generate a load counteracting an urging force of said diaphragm spring such that change in the pressing load to said pressure plate in response to displacement magnitude of said diaphragm spring is decreased; and
  a second elastic member being supported by said clutch cover to generate a load counteracting an urging force of said diaphragm spring during a release operation such that pressing load to said pressure plate is progressively decreased as displacement magnitude of said diaphragm spring is increased by the cushioning effect of the friction member,
  said first and second elastic members being arranged in an axial direction.

11. The clutch cover assembly according to claim 10, wherein said first and second elastic members are located coaxially.

12. The clutch cover assembly according to claim 10, wherein said second elastic member is located between said first elastic member and said pressure plate in the axial direction.

13. The clutch cover assembly according to claim 10, wherein said first elastic member includes a plurality of first elastic members arranged in the circumferential direction to start to produce the loads at least at different times in response to change in displacement magnitude of said diaphragm spring.

14. The clutch cover assembly according to claim 10, further comprising a support member fixed to said pressure plate to receive the load from said first and second elastic members.

15. The clutch cover assembly according to claim 14, further comprising a wear compensation mechanism to maintain a posture of said second elastic member in response to wear of the friction member, wherein
  said wear compensation mechanism includes
    said support member that extends from said pressure plate toward said clutch cover,
    a first support and engagement member,
    a second support and engagement member that is threadedly engaged with the outer circumference of said support member and is given a load from said second elastic member in an axial direction away from the friction member, and
    a third elastic member to apply constantly torque to said second support and engagement member so that said support and engagement member will rotate to move in an axial direction away from the friction member.

16. The clutch cover assembly according to claim 15, wherein said first support and engagement member is fixed to said support member, said first support and engagement member receives a load from said first elastic member in the axial direction away from the friction member, and
  said second support and engagement member is located between said first support and engagement member and said pressure plate in the axial direction.

17. The clutch cover assembly according to claim 10, further comprising
  a plurality of fixing members to fix said first elastic member to said clutch cover, wherein
  said first and second elastic members are cone springs, and outer circumferential portions of said first and second elastic members are sandwiched between said fixing members and said clutch cover in the axial direction.

18. The clutch cover assembly according to claim 17, wherein an intermediate member is sandwiched between outer circumferential portions of said first and second elastic members in the axial direction.

19. A clutch cover assembly for pressing a friction member of a clutch disc assembly with a cushioning function against a flywheel of an engine and for releasing the pressing, comprising:

a clutch cover being configured to be fixed to the flywheel;

a pressure plate being non-rotatably fixed to said clutch cover to sandwich the friction member between the flywheel and itself;

a diaphragm spring being supported by said clutch cover to urge said pressure plate toward the flywheel;

a first elastic member being supported by said clutch cover to generate a load counteracting an urging force of said diaphragm spring such that change in the pressing load to said pressure plate in response to displacement magnitude of said diaphragm spring is decreased; and a second elastic member being supported by said clutch cover to generate a load counteracting an urging force of said diaphragm spring during a release operation such that pressing load to said pressure plate is progressively decreased as displacement magnitude of said diaphragm spring is increased by the cushioning effect of the friction member, said second elastic member being located between said first elastic member and said pressure plate in the axial direction.

20. A clutch cover assembly for pressing a friction member of a clutch disc assembly with a cushioning function against a flywheel of an engine and for releasing the pressing, comprising:

a clutch cover being configured to be fixed to the flywheel;

a pressure plate being non-rotatably fixed to said clutch cover to sandwich the friction member between the flywheel and itself;

a diaphragm spring being supported by said clutch cover to urge said pressure plate toward the flywheel;

a first elastic member being supported by said clutch cover to generate a load counteracting an urging force of said diaphragm spring such that change in the pressing load to said pressure plate in response to displacement magnitude of said diaphragm spring is decreased;

a second elastic member being supported by said clutch cover to generate a load counteracting an urging force of said diaphragm spring during a release operation such that pressing load to said pressure plate is progressively decreased as displacement magnitude of said diaphragm spring is increased by the cushioning effect of the friction member; and a support member being fixed to said pressure plate to receive the load from said first and second elastic members.

\* \* \* \* \*